(12) United States Patent
Wood

(10) Patent No.: US 6,178,514 B1
(45) Date of Patent: Jan. 23, 2001

(54) METHOD AND APPARATUS FOR CONNECTING A DEVICE TO A BUS CARRYING POWER AND A SIGNAL

(76) Inventor: Bradley C. Wood, 6738 Independence Ave. Apt. 102, Canoga Park, CA (US) 91303

( * ) Notice: Under 35 U.S.C. 154(b), the term of this patent shall be extended for 0 days.

(21) Appl. No.: 09/127,642

(22) Filed: Jul. 31, 1998

(51) Int. Cl.[7] .................................................. G06F 1/26
(52) U.S. Cl. ..................... 713/300; 713/340; 713/320; 710/129
(58) Field of Search ................................. 713/300, 320, 713/340, 310, 330, 322–24; 710/126, 129

(56) References Cited

U.S. PATENT DOCUMENTS

| | | | |
|---|---|---|---|
| 5,655,138 | * 8/1997 | Kikinis | 395/800 |
| 5,675,813 | * 10/1997 | Holmdahl | 713/300 |
| 5,799,196 | * 8/1998 | Flannery | 713/300 |
| 5,841,268 | * 11/1998 | Mednik | 323/222 |

* cited by examiner

*Primary Examiner*—Ario Etienne

(57) ABSTRACT

The object of the invention is to interface a device to a bus carrying power and a signal while simultaneously complying with bus-standard current draw limits, storing power for the device in an energy storage device located in the interface apparatus, and conditioning the bus signal as a function of the energy level of the signal received by the interface device from the bus and the level of energy measured in the energy storage device in the interface apparatus. As shown in FIG. 29, according to one aspect of the invention the interface apparatus (472) includes an input filter (480), a current limiter (482), a power converter (483), an energy storage device (484), a signal decoder/controller (486) and a signal conditioner (488). In operation, power flows from the bus through input filter (480) through the current limiter (482) to the power converter (483), which converts the power to a form suitable for charging the energy storage device (484). The output of the energy storage device provides power to the device. The bus signal is received by the signal decoder/controller (486), which performs any necessary decoding before sending the signal onto the signal conditioner (488). Signal decoder/controller (486) also is connected to and controls power converter 483. Signal conditioner (488) measures the level of energy stored in energy storage device (484) then generates and conveys to the signal input of the device an output signal that is a function of the energy level of the bus signal and the measured level of energy in the energy storage device (484).

23 Claims, 19 Drawing Sheets

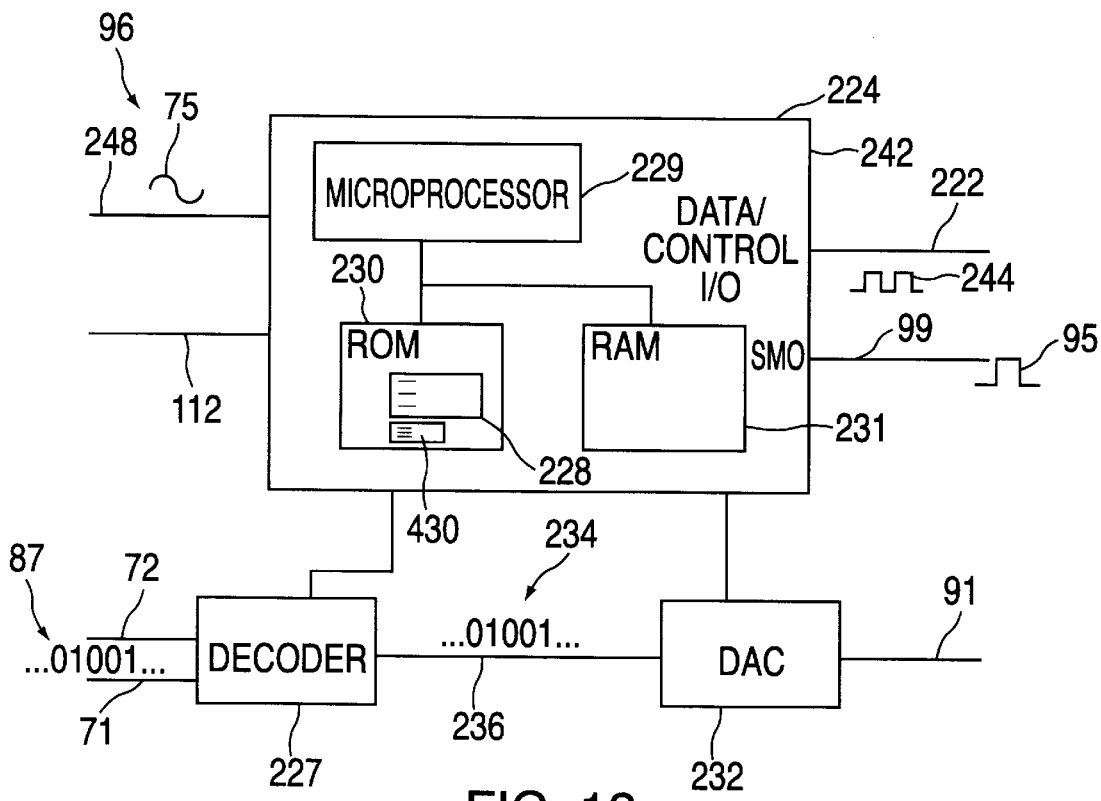
FIG. 12
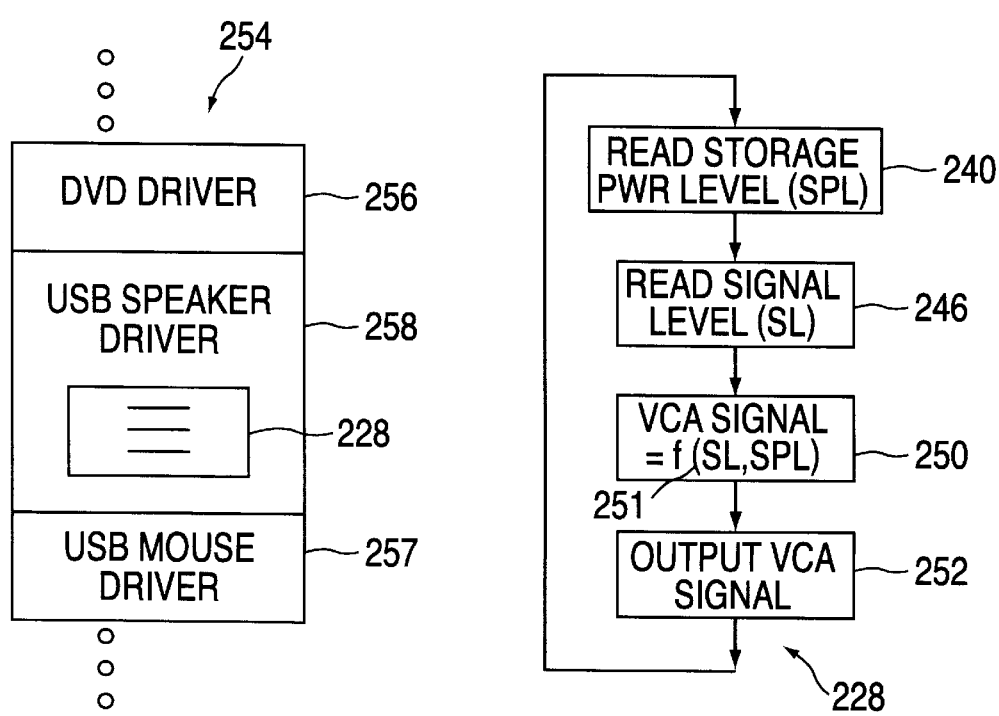
FIG. 14
FIG. 13

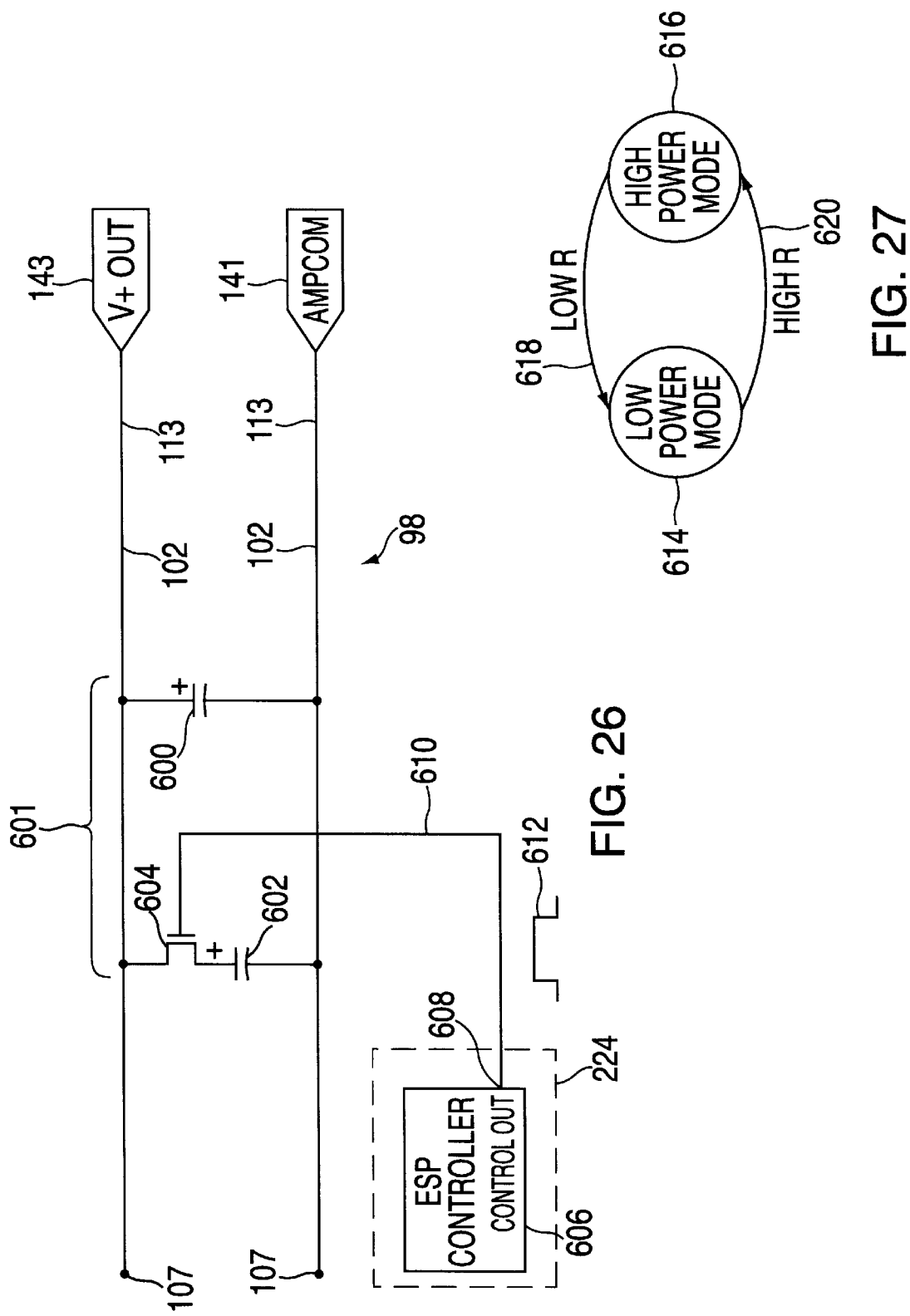

METHOD AND APPARATUS FOR CONNECTING A DEVICE TO A BUS CARRYING POWER AND A SIGNAL

BACKGROUND

The present invention relates to a method and apparatus for connecting a device to a bus carrying power and a signal, and more particularly to a method and apparatus for connecting a computer peripheral bus or a consumer electronics bus carrying power and a signal to a peripheral device, such as a speaker, that is powered in whole or in part by the bus and that uses the signal carried by the bus.

The universal serial bus ("USB") holds great promise for improving the ease with which computer peripherals, such as keyboards and speakers, can be attached to personal computers. The USB standard is specified in a series of documents available via the World Wide Web at http:\\www.usb.org.

One important aspect of the USB standard is management of devices that draw power from the USB. The USB standard defines two types of devices, low power devices that draw 100 mA of bus current and high power devices that draw 500 mA or less of the bus current.

The USB standard supports attaching to a USB both devices that draw power from the USB and devices that are powered by other, external, sources of power such as batteries or line voltage transformers.

The importance of power management and the relatively low power drain supported by the USB standard has led to two separate approaches for USB devices that may draw more than the permitted power. One is to create a "powered" hub that draws power from an external source to support more peripheral devices that the USB can power alone. The other is to provide an external power supply for the particular USB device.

While it is generally adequate to use powered hubs (with their external power supplies) with other USB peripheral devices (with their external power supplies), the need for external power supplies makes the connecting and the operating the devices more complex than if the device were powered from the USB alone. Moreover, with external power supplies such as batteries or wall transformers, there is the disadvantage of loss of power to the peripheral due to the battery draining or the wall transformer becoming dislodged from the wall. Wall transformers are also often unattractive (hence the nickname "wall wart") and have cords that can become entangled. Batteries can be expensive to replace. Batteries can also be hassles to change.

All of these disadvantages of external powered computer peripheral devices are particularly acute for users of speakers. Speaker users are particularly sensitized to issues of speaker performance and ease of operation. Speakers typically operate in pairs (to provide for the option of stereo sound), so a speaker "problem" is usually a double problem. Computer speakers may be embedded in another computer peripheral (such as a desk top keyboard or monitor), in which case they are generally not usable with other computers, and may still require the use of external power supplies and additional cabling for operation with the initially intended computer. Computer speakers may be attached to a personal computer via cables to allow wider separation for optimum stereo separation, in which case an extra cable for the wall transformer is an unwelcome complication.

One great appeal of USB peripherals, such as USB speakers, stems from their "Plug and Play" installation and their operational behavior. With Plug and Play, installing new peripherals does not require disassembly of the computer case to install special cards or change jumper/switch settings of existing cards and does not require knowledge of interrupt request and DMA settings. The new peripheral identifies itself upon interrogation by the host computer system. The USB protocols, correctly implemented, assure absence of device conflicts.

It is therefore unfortunate that existing implementations of USB speakers and many other USB peripheral devices require the devices to be "self-powered" (i.e., not powered by the USB) due to the limited power available from USB ports. Self powered USB devices, by definition, have the added complication of batteries or transformers or other means of supplying external power to their associated USB device. Yet most of these self-powered USB devices do not require average power in excess of the continuous power available from low-power or high-power USB ports. In particular, while speakers reproducing music, typical speech, or game sound effects require large peak powers, they require far less average power, even if their power requirements are averaged over a time scale of the order of a few tenths of a second. Other peripheral devices with similar power demand characteristics include printers, infra-red data links, scanners and other devices in which electro-mechanical or electro-optical transduction is, or can be, discontinuous and of a low duty cycle.

There is therefore a need for a device that provides a high intermittent peak power output while simultaneously limiting its current input to an amount at or below the maximum current input allowed by the USB standard or by the standard of any other bus (such as other serial buses, like the serial bus defined by IEEE-1394, or parallel buses, like the Small Computer Systems Interface or SCSI bus).

SUMMARY OF THE INVENTION

The present invention relates to an apparatus and method for interfacing a bus to a device. The bus includes a power line carrying power and a signal line carrying a signal. The device including a power input and a signal input. The interface includes a power output connected to the device power input; a power input connected to the bus power line; a signal input connected to the bus signal line; a signal output connected to the device signal input; an energy storage device having an input and an output, the energy storage device output connected to the interface apparatus power output; and a power converter having a power input connected to the interface apparatus power input and a power output connected to the energy storage device input, whereby the power converter receives power from the bus power line and converts it to a form suitable for charging the energy storage device. The power converter further includes a current sensor and a current limiter. The current sensor is connected in series with the power converter power input and output and has an output carrying a signal representative of the current flowing through the current sensor. The current limiter has a predetermined current limit and is operably connected to the power converter power input and power output. The current limiter also has an input connected to the current sensor output for receiving the current sensor signal representative of the current flowing through the current sensor, whereby the current limiter limits the current drawn by the device and the interface apparatus to the predetermined current limit. The interface also includes a signal conditioner that has a first input connected to the energy storage device output, a second input connected to interface apparatus signal input or the interface apparatus signal output, and an output connected to the interface apparatus signal output. The signal conditioner includes a transfer function that produces a signal conditioner output signal at the signal conditioner output. This transfer function is a function of the level of energy in the energy storage device and the level of energy of the bus signal or the signal conditioner output signal.

In another aspect of the present invention, the power converter further includes a linear current device, a buck converter, a boost converter or a flyback converter connected to the power converter power input and to the energy storage device input, whereby the device or the converter converts power from the bus power line into a form suitable for charging the energy storage device.

In yet another aspect of the present invention, the energy storage device includes a capacitor connected between the energy storage device input and output.

In another aspect of the present invention, the energy storage device includes a first capacitor; a second capacitor; a first switch having an open and a closed position; and an energy storage device controller. The energy storage device input further includes a first line and a second line. The first and second lines are capable of being at different voltage potentials with respect to each other. The first capacitor is connected across the first and second energy storage device lines. The second capacitor is connected in series with the first switch, and the series combination of the first switch and the second capacitor is connected across the first and second energy storage lines and in parallel with the first capacitor. When the first switch is closed the first and second capacitors are connected in parallel across the energy storage device input and when the first switch is open only the first capacitor is connected across the energy storage device input.

In another aspect of the invention, the energy storage device has a predetermined maximum energy storage level and the signal conditioner further includes a voltage controlled amplifier, first low pass filter network and a clip and detect limiter. The voltage controlled amplifier has a signal input connected to the interface apparatus signal input, a signal output connected to the signal conditioner signal output, and a control input. The voltage control amplifier amplifies the interface apparatus signal input to produce the signal conditioner signal output by an amount of amplification controlled by the voltage controlled amplifier control input. The first low pass filter network has a predetermined filter characteristic, a signal input, and a signal output connected to the voltage controlled amplifier control input. The clip and detect limiter includes a voltage scaler and a comparator. The voltage scaler has a predetermined scaling factor and has an input and an output. The voltage scaler input is connected to the energy storage device output for receiving a signal representative of the level of energy stored in the energy storage device. The voltage scaler output conveys a signal proportional to the voltage scaler input by the predetermined scaling factor. The comparator has a first input connected to the voltage scaler output that receives the voltage scaler output signal, a second input connected to the voltage controlled amplifier signal output for receiving the voltage controlled amplifier output signal, an output connected to the input of the first filter network that conveys to the first filter network input a comparator output signal, and a predetermined comparator threshold level against which the signal received from the voltage scaler is compared. When the voltage scaler output signal is above the predetermined comparator threshold the comparator produces a comparator output signal that is substantially equivalent to the voltage controlled amplifier output signal received at the comparator second input, and when the voltage scaler output signal is below the predetermined comparator threshold level the comparator produces a comparator output signal that is the voltage controlled amplifier output signal reduced in magnitude by an amount proportional to the amount by which the voltage scaler output signal is below the predetermined comparator threshold level. The voltage controlled amplifier control input reduces the amplification of the voltage controlled amplifier when the voltage scaler output signal is below the predetermined comparator threshold level.

In other aspects of the invention, the first low pass filter network includes predetermined attack and decay profiles and the first low pass filter network is a resistor-capacitor network.

In another aspect of the invention, the bus signal has a predetermined frequency range and the signal conditioner includes a summing amplifier, a plurality of frequency band filters, a frequency band variable amplifier associated with each frequency band filter and a signal conditioner controller. The summing amplifier has a plurality of inputs and an output, and the output connected to the signal conditioner signal output. Each frequency band filter is of predetermined bandwidth and occupies a predetermined portion of the bus signal frequency range. Each frequency band filter has an output and an input, and each input is connected to the signal conditioner signal input. Each frequency band variable amplifier has a control input to control its degree of amplification, a signal input connected to the output of its associated frequency band filter and has a signal input connected to one of the summing amplifier inputs. The signal conditioner controller has a signal input connected to the signal conditioner signal input, an energy storage device energy level control input connected to the output of the energy storage device, and a plurality of control outputs, one connected to each of the frequency band variable amplifier control inputs. The signal conditioner controller further includes a transfer function for each frequency band variable amplifier that produces control signal to control the degree of amplification that is a function of the level of energy in the energy storage device, the level of energy in the signal received at the signal conditioner signal input, and the particular frequency band filter associated with the particular frequency band variable amplifier.

In accordance with other aspects of the invention, at least one frequency band variable amplifier is a voltage controlled amplifier and the signaler includes a low pass filter positioned between the plurality of frequency band filters and the signal conditioner signal input.

In accordance with another aspect of the invention, there is an apparatus for interfacing a bus powered amplifier to a universal serial bus. The bus power amplifier includes a power input that receives power to power the amplifier, a signal input that receives a signal to be amplified and a signal output that outputs the amplified signal. The universal serial bus includes a power line and a signal line. The signal line includes a data signal representative of an analog signal to be amplified by the bus powered amplifier. The interface apparatus includes a universal serial bus decoder, a current sensor, a current limiter, an energy storage device, a power converter, an energy storage device energy sensor and a signal conditioner. The universal serial bus decoder has a signal input operably connected to the universal serial bus signal line and has a signal output. The universal serial bus decoder decodes the data signal from the universal serial bus signal line into an equivalent first analog signal and makes the first analog signal available at its signal output. The current sensor is connected in series with the universal serial bus power line. The current sensor senses the amount current drawn by the interface apparatus. The current limiter is connected in series with the universal serial bus power line and is operably connected to the current sensor. The current limiter limits the current drawn by the apparatus from the bus power line in response to the amount of current sensed by the current sensor. The energy storage device has a power input and a power output, and its power output is connected to the power input of the bus powered amplifier. The power converter is operably connected to the current sensor and is connected to the power input of the energy storage device and to the bus power line. The power converter converts power from the universal serial bus power line into a form suitable for storage by the energy storage device. The energy storage device energy sensor is connected to the power output of the energy storage device. The energy storage device energy sensor measures the amount of energy stored in the energy storage device. The signal conditioner has an input operably connected to the energy storage device energy sensor and an input operably connected to the universal serial bus decoder signal output. The signal conditioner has a transfer function that creates a signal conditioner output signal that is a function of its input signals. The signal conditioner receives the first analog signal and generates signal conditioner output signal that is a function of the energy level stored in the energy storage device and the level of the first analog signal.

In accordance with other aspects of the invention, the energy storage device is a capacitor and the current limiter limits the current drawn from the universal serial bus power line by the amplifier interface apparatus and the bus powered amplifier to 100 mA or less, or to 500 mA or less.

In accordance with other aspects of the invention, the power converter further includes either a linear current device, buck converter, a boost converter or a flyback converter connected to the bus power line and to the energy storage device input, whereby the particular device or converter converts power from the bus power line into a form suitable for charging the energy storage device.

In accordance with another aspect of the invention there is disclosed a method for interfacing a bus to a device. The bus includes a power line carrying power and a signal line carrying a bus signal. The device includes a power input and a signal input for receiving a device input signal. Under this method, power is drawn from the bus power line and stored in an energy storage device. Simultaneously with the drawing and storing power step, a device input signal is created that is a function of the level of energy stored in the energy storage device and the level of energy in the bus signal. Simultaneously with the drawing and storing power step and the creating a device input signal step, the current drawn from the bus power line by the device power input is limited to a predetermined current threshold.

In accordance with another aspect of the invention, the step of drawing and storing power includes the step of converting the power drawn from the bus power line to a form suitable for storing in the energy storage device.

In accordance with another aspect of the invention, the step of drawing and storing power includes the steps of determining the level of energy stored in the energy storage device; and drawing power from the bus power line and storing the drawn power in an energy storage device only when the level of energy stored in the energy storage device is less than a predetermined threshold.

In accordance with another aspect of the invention, the step of creating a device input signal includes the step of creating a device input signal that is the bus signal amplified by a constant, predetermined factor when the level of energy in the energy storage device is greater than a predetermined threshold, and otherwise creating a device input signal that is the bus input signal amplified by a factor determined by reducing the predetermined factor by an amount that is a function of the degree to which the energy storage device is less than the predetermined factor.

In accordance with yet another aspect of the present invention there is disclosed a method for interfacing a host computer containing a digitized sound signal that represents a substantially equivalent analog signal via a peripheral bus to a bus powered speaker to play the digitized sound signal. The bus includes a power line carrying power and a signal line carrying a bus signal. The bus powered speaker includes a power input, a signal input for receiving a speaker input signal, an amplifier for amplifying the speaker input signal and a speaker for converting the amplified speaker input signal to sound. According to this method, first the digitized sound signal is read and an equivalent analog signal level is determined for the substantially equivalent analog signal of one or more of the digitized sound samples contained in the digitized sound signal. Next for each equivalent analog signal level determined in the reading and determining step, a digitized representation is created for the equivalent analog signal level. Next for each digitized representation for the equivalent analog signal level, the digitized representation for the equivalent analog signal level is embedded in a digital data stream that includes the digitized sound signal from which the equivalent analog signal level was determined in the previous step. Then the digital data stream is sent to the bus powered speaker signal input via the peripheral bus signal line. Next power is drawn from the bus power line and stored in an energy storage device in the bus powered speaker. Simultaneously with the step of drawing and storing power, the current drawn from the bus power line by the bus powered speaker is limited to a predetermined threshold. During the drawing and storing power step and the current limiting step, the digital data stream is decoded and received at the speaker signal input to recover the substantially equivalent analog signal and to recover the equivalent analog signal level. During the drawing and storing power step and the current limiting step, the equivalent analog speaker signal is amplified by a factor that is a function of the equivalent analog signal level and the level of energy stored in the energy storage device.

These and other features, aspects and advantages of the present invention will become better understood with regard to the following description, appended claims and accompanying drawings, where:

BRIEF DESCRIPTION OF THE DRAWINGS

FIG. 12 is a functional block diagram of an implementation of the USB decoder/DAC of FIG. 7.

FIG. 13 is a flowchart of the software that can be used by the USB Decoder/DAC to control the VCAs of FIG. 11.

FIG. 14 is a pictorial representation of USB speaker driver software, resident in host computer 12, for controlling the VCAs of FIG. 11.

FIG. 26 is a schematic diagram of a preferred implementation of an energy storage device of FIG. 7 that has two modes of operation, a high power mode and a low power mode.

FIG. 27 is a state diagram showing the transition of the energy storage device of FIG. 26 between low and high power modes.

DETAILED DESCRIPTION OF THE PREFERRED EMBODIMENTS

Overview of USB Architecture

Figure 1:
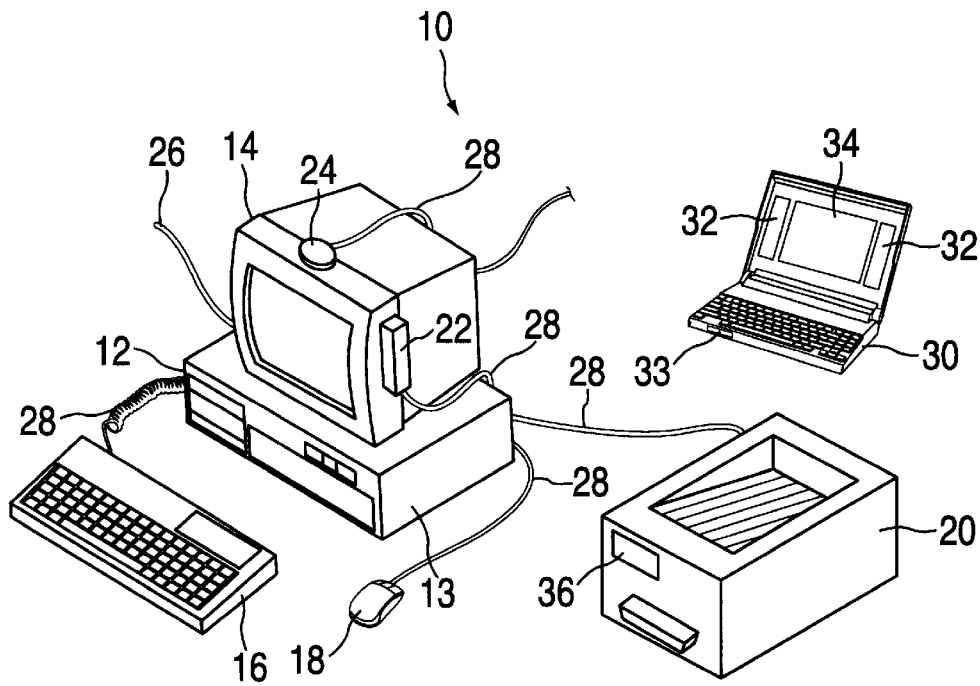
FIG. 1 is a pictorial representation of a desk top computer system and a lap top computer system embodying the present invention.

Referring now to FIG. 1, there is shown a personal computer system 10, including a desktop personal computer 12 and its display monitor 14.

FIG. 1 also shows a number of peripheral devices that attach to computer 12 via USB cables 28, including a keyboard 16, a mouse 18, a printer 20, stereo speakers 22 that are mounted to either side of monitor 14, and an IR transmitter/receiver 24 mounted on top of monitor 14. Computer 12 can communicate to printer 20 via the USB cable 28 between computer 12 and printer 20, or via IR transmitter/receiver 24 and a complementary IR transmitter/receiver 36 attached to printer 20 and in communication with the internal bus structure (not shown) of printer 20. A connection to a computer network (not shown) is represented by its cable 26, which attaches to a network card (not shown) in computer 12. Other configurations of computer system 10, including other peripheral devices, would be well known to those skilled in the art, and so are not described here in detail.

Frequently a user of a desktop computer 10 will also use a lap top computer 30. Typically the lap top 30 includes many of the same peripheral devices as desk top computers, such as stereo speakers 32, integrally mounted to lap top 30 and positioned to either side of a LCD display 34. Speakers 32 may be "hardwired" to the sound card (not shown) of lap top 30, or may be connected to the internal bus structure (not shown) of laptop 30 via internal USB connections (not shown). Laptop 30 includes an IR transmitter/receiver 33, integrally mounted to an exterior portion of lap top 30 and in communication with the internal bus structure of lap top 30, for communicating with similar IR transmitter/receivers 24 and 36 of computer 12 and printer 20, respectively. Other configurations of lap top 30 would be well known to one skilled in the art, and so are not described here in detail.

The details of the USB standard and the operation of devices employing the USB standard will not be discussed in detail here. A detailed description of the standard and the operation of devices employing the standard can be found in the Universal Serial Bus Specification, Revision 1.0, copyright 1996 by Compaq Computer Corporation, Digital Equipment Corporation, IBM PC Corporation, Intel Corporation, Microsoft Corporation, NEC and Northern Telecom. Up to date information is currently available at the USB standards organization World Wide Web site, http:\\www.usb.org. Some understanding of the basics of the USB standard is desirable for understanding aspects of the present invention.

Figure 2:
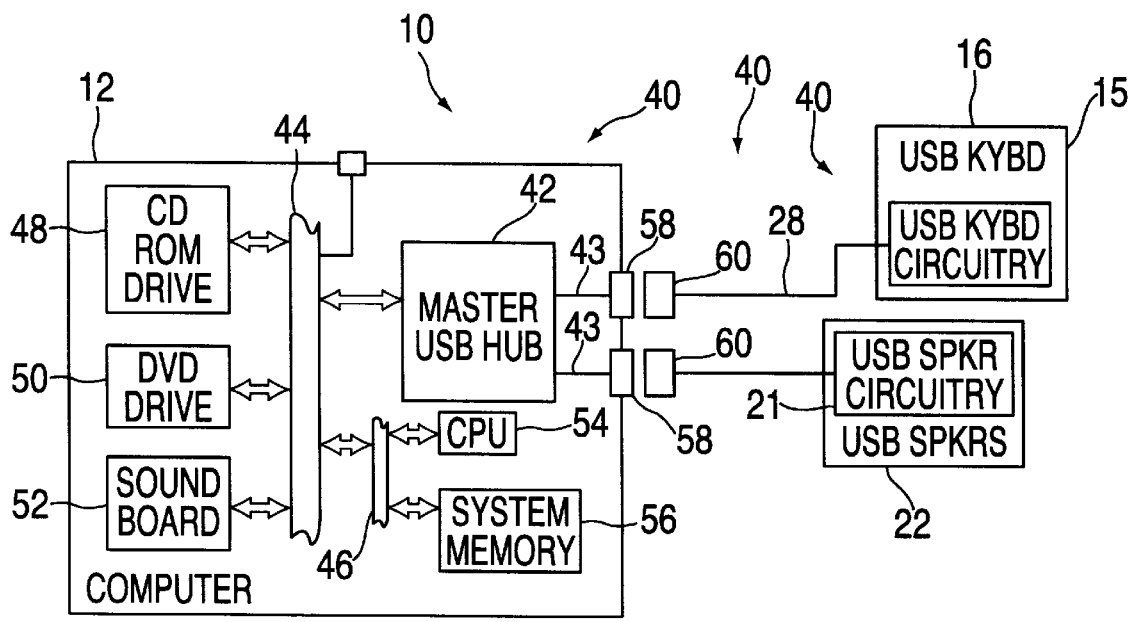
FIG. 2 is a functional block diagram of the bus architecture of the desk top computer system of FIG. 1.
Figure 3:
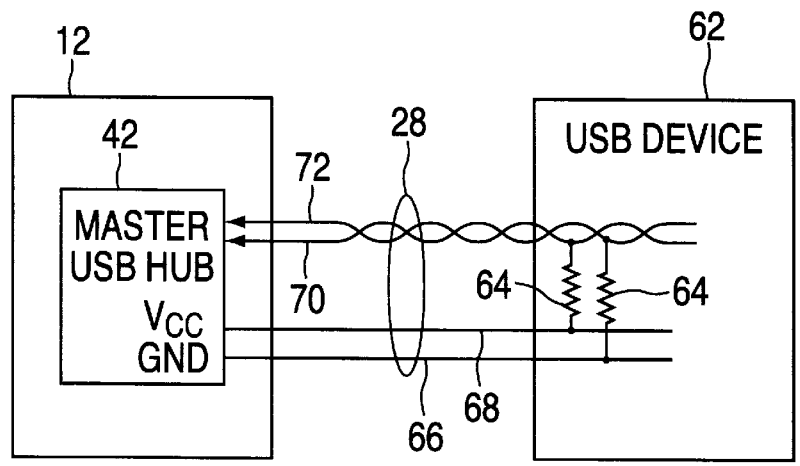
FIG. 3 is a detailed functional diagram of the cable between the master USB hub resident in the desktop computer and a USB peripheral device connected to the desktop computer of FIG. 1.

Referring now to FIGS. 2 and 3, in FIG. 2 there is shown a functional block diagram illustrating the connection topology of the USB 40 in computer system 10. Within computer 12, USB 40 includes master USB hub 42, which communicates with an internal bus 44 of computer 12. Also attached to internal bus 44 are a number of devices internal to computer 12, including but not limited to CD ROM drive 48, DVD Drive 50 and sound board 52. Internal bus 44 provides both power to the attached devices (including master USB hub 42) and an avenue for the exchange of data and control signals between the attached devices.

Also attached to internal bus 44 to exchange data and control signals are devices essential to the operation of computer 12, such as one or more CPUs 54 and system memory 56 (ROM, RAM and Cache). Typically, however, computer 12 includes one or more internal buses 46, operating at a greater clock speed than bus 44, that interconnect CPU 54 and system memory 56 (and possibly other devices not shown). Bus 44 and bus 46 are connected via appropriate interfaces (not shown) that coordinate the transfer of data and control signals among the buses 44 and 46, taking into account varying bus geometry and clock speeds. The operation of these internal bus structures 44 and 46 are well known and form no part of the current invention. Many architectures of the internal buses of computer 12 would be well known to those skilled in the art, including various other mezzanine bus structures and various industry standards for connecting high speed peripheral devices and memory (such as VLB, PCI and VXI).

Master USB hub 42 communicates to each USB device external to computer 12, such as USB speakers 22, via an internal cable 43 that connects to a standard USB connector 58, typically attached to the housing 13 of computer 12. A mating standard connector 60 removably attaches to connector 58 and connects to a standard USB cable 28. USB cable 28 in turn connects via the appropriate mechanism (e.g., solder, other type of PWB connector) to suitable USB interface circuitry associated with each USB device (e.g., USB speaker circuitry 21 for USB speakers 22 and USB keyboard circuitry 15 for USB keyboard 16 in FIG. 2). The physical specifications for cables 43 and 28 and connectors 58 and 60 are specified in detail in the USB standard.

Referring now to FIG. 3, there is shown a USB cable 28 connecting master USB hub 42 to a generic USB device 62. For ease of illustration connectors 58 and 60 are not shown. Each cable 28 includes four wires. Two wires 66 and 68 carry power, respectively ground and Vcc. Under the USB standard, master USB hub 42 provides a maximum of 500 mA in normal operation to the USB devices 62, if any, connected to hub 42. Vcc is a nominal 5 volts.

Figure 30:
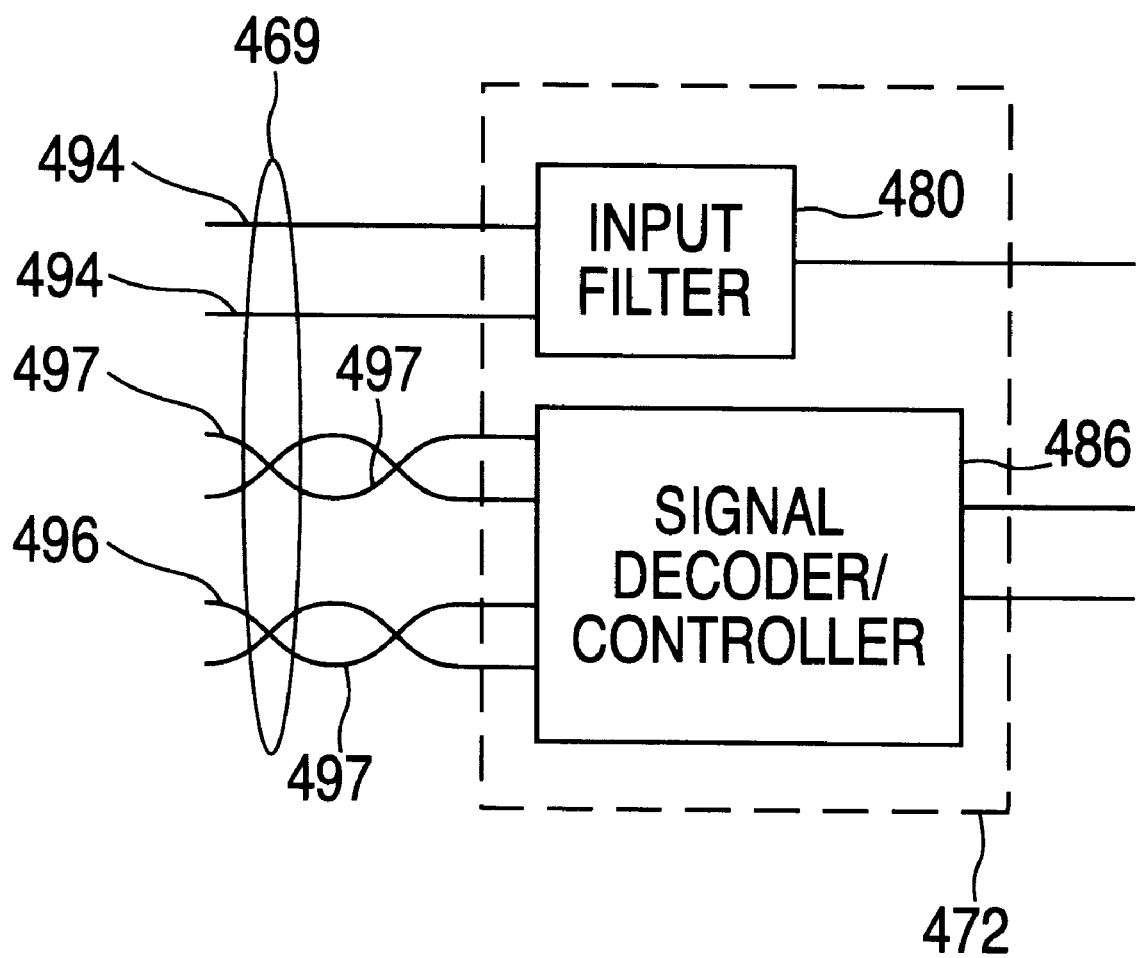
FIG. 30 is a pictorial representation of a the interface between a cable implementing an IEEE-1394 bus and the current limiting and signal conditioning stage of FIGS. 28 and 29.

Two wires 70 and 72 carry data signals. The USB standard supports two configurations for data wires 70 and 72, a high speed version with the wires 70 and 72 as a twisted pair (as shown in FIG. 30) and a non-twisted pair low speed version. To differentiate between the two versions the USB standard specifies that termination resistors 64 connect wires 70 and 72 to wires 68 (Vcc) and 66 (GND), respectively, for one version, and in the opposite manner to wires 66 (GND) and 68 (Vcc), respectively, for the other version. Termination resistors 64 also provide a mechanism by which master USB hub 42 can determine how many devices 62 are connected to it: Hub 42 senses the voltage across wires 70 and 72 due to resistors 64 when a device 62 is connected to hub 42. Absent a device 62, this voltage is not present.

The USB standard supports two designations of USB devices 62, low power and high power. Low power devices 62 are devices constrained to consume 100 mA of current or less. Regardless of the actual power consumed by a low power device 62, under the USB standard master USB hub 42 treats each low power device as capable of drawing 100 mA of current, which is defined as one unit of current load. In terms of power, the 100 mA current limitation translates into only 0.5 W (100 mA×5 V). For USB powered speakers (such as stereo speakers 22 in FIG. 1), this means a maximum instantaneous power draw of only 0.25 W per speaker, in the typical case of equal amplitude signals for each channel.

High power devices 62 are devices that are constrained to consume typically more than 100 mA, but no more than 500 mA of current from a USB port if they are bus powered devices. If a USB peripheral device is intended to draw more than 500 mA of current, typically it is provided with an external power supply (not shown) (e.g., a battery, a wall transformer, or an in-line transformer) to satisfy its power demands in excess of the power it can draw from the USB port to which it is attached. An external power supply may also be required by a high power device that draws less than 500 mA of current, but which shares master hub 42 with other USB devices (attached to other ports) that are bus-powered and that share the 500 mA provided by master hub 42. Whenever a USB device uses an external power supply, it is described as self-powered, even though it may draw some power from USB power conductors 66 and 68.

Under the USB standard, all devices 62, whether high power or low power, must power up in the low power state. High power devices 62 must remain in the low power state until they receive permission from master USB hub 42 to transition to the high power state.

The USB standard includes a mode of operation called "suspend." The suspend mode is designed to work with the power management system (not shown) of the host computer 12 to allow reduced power consumption by computer system 10 (shown in FIG. 1). Reduced power consumption is particularly important to power sensitive systems, such as battery-based notebook computer 30 (shown in FIG. 1). A device 62 placed in suspend mode is limited to drawing 500 micro amperes of current from the master USB hub 42.

Figure 4:
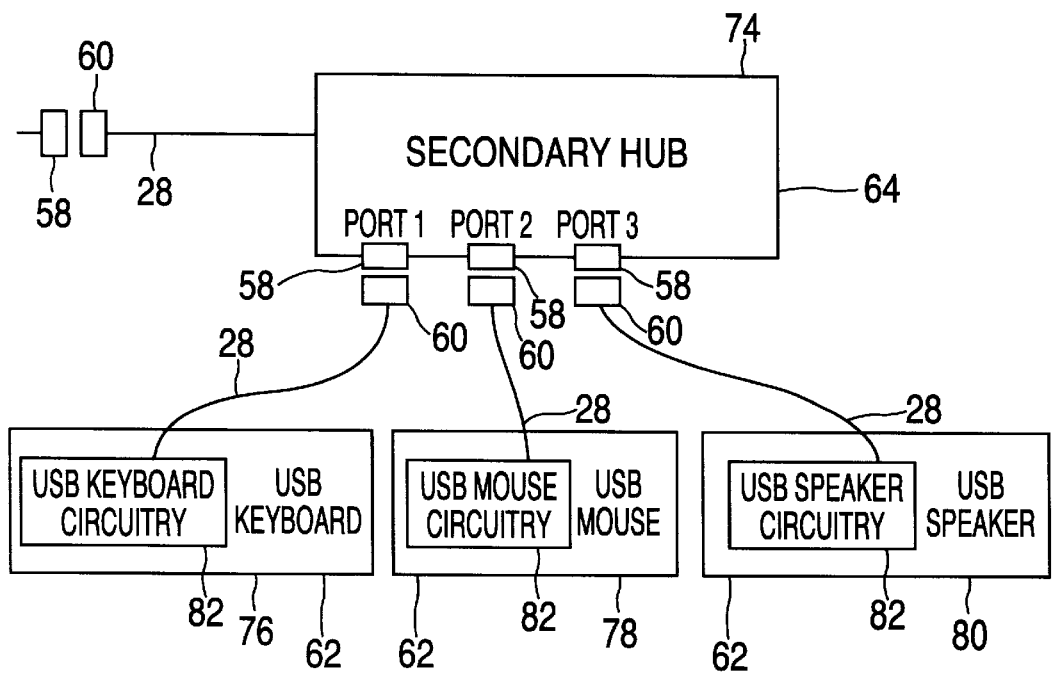
FIG. 4 is a functional block diagram of a secondary hub and associated USB peripheral devices.
Figure 5:
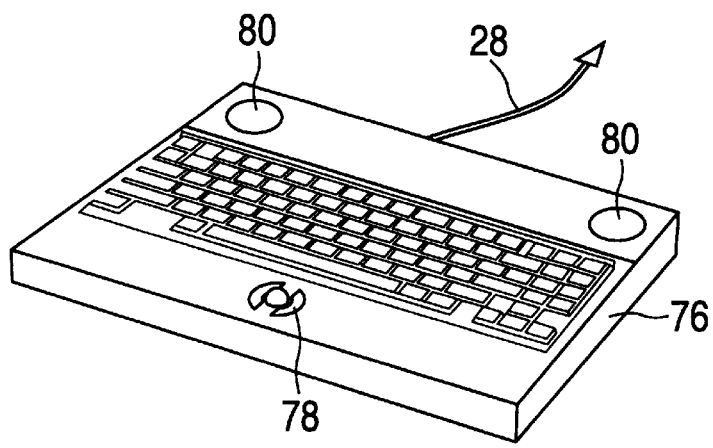
FIG. 5 is a pictorial representation of a laptop computer containing the secondary hub and associated peripheral devices of FIG. 4.

The USB standard greatly simplifies the task of connecting different computer peripheral devices 62 to a computer 12. However, if each device 62 requires a cable 28 to connect it back to master USB hub 42, cable management can still present formidable obstacles to the quiet enjoyment of computer system 10. One solution, illustrated in FIGS. 4 and 5, is to provide a secondary hub 74. Secondary hub 74 connects via its USB cable 28 and USB connector 60 to connector 58 of master USB hub (not shown). Secondary hub 74 includes two or more USB connectors 58 to which can connect one or more USB devices, such as USB keyboard 76, USB mouse 78 or USB speakers 80. Each USB device 76, 78 and 80 includes device specific USB interface circuitry 82 that connects its associated cable 28 to the internal workings (not shown) of each device 76, 78 and 80.

Secondary hub 74 is shown functionally in FIG. 4 as a separate device. Its physical embodiment, however, could be as a stand alone device (not shown) or it could be housed in another device, such as USB keyboard 76 as shown in FIG. 5. The cables 28 from keyboard 76, mouse 78 and speakers 80 are connected within the housing of keyboard 76 to secondary hub 74. Keyboard 76 also houses USB mouse 78 and USB speakers 80. The sole USB cable 28 from keyboard 76 to a computer (not shown) is actually the cable 28 from secondary port 74.

Secondary hub 74 can either be powered by a master USB hub (not shown) or powered by an external power source (not shown), such as a battery. A description of a bus powered secondary hub 74 is provided in U.S. Pat. No. 5,675,813 (the "'813 patent"), issued Oct. 7, 1997 to Holmdahl, and assigned to Microsoft Corporation and incorporated herein by reference. Particularly interesting in the '813 patent is the description of the dialog that takes place between the bus powered hub and the master USB hub.

Overview of the Basic Bus Powered Interface

Referring now to FIGS. 1, 2, 6, 7 and 8, FIG. 6 depicts a functional block diagram of USB speaker 22 of FIGS. 1 and 2 embodying the current invention. In the first preferred embodiment, USB speaker 22 is a bus powered device which can operate as either a low power device (drawing 100 mA or less current from master USB hub 42) or a high power device (drawing 500 mA or less current from master USB hub 42). Like all USB devices, USB speaker 22 initially powers up as a low power device.

USB speaker 22 includes USB speaker circuitry 21, amplifier 84, and at least one speaker 86. Preferably speaker 86 includes at least two speakers configured with USB speaker circuitry 21 and amplifier 84 to provide stereo sound. Of course, other configurations are possible, including monotone (e.g., the same sound from one or more speakers), stereo with separate subwoofer, woofer, midrange and/or separate tweeter, stereo plus center speaker, and various surround sound systems (not shown).

In operation USB speaker circuitry 21 decodes the serial digital data and control signals 87 received from master USB hub 42. Signals 87 include digital representations of sound, which circuitry 21 converts into analog signals 88 representative of sound. The number and format of converted analog signals 88 depends on the particular configuration of USB speaker 22. For stereo sound, two signals 88 would be decoded. Sound signals 88 are conveyed to amplifier 84, which amplifies signals 88 to produced amplified signals 90. Signals 90 are conveyed to speakers 86 to drive speakers 86 to produce sound 77.

Amplifier 84 can be any suitable amplifier known to one skilled in the relevant art. Preferably amplifier 84 is a highly efficient type of amplifier, such as class D (switch mode type), a class G or class H amplifier, to maximize the power available to amplify signal 88. Other possible amplifier classes include classes A, AB, B and C. Preferably amplifier 84 is configured to amplify a signal 88 that is stereo. Other possible signals 88 include monaural and center surround sound, and other audio configurations well known to those skilled in the art.

Figure 7:
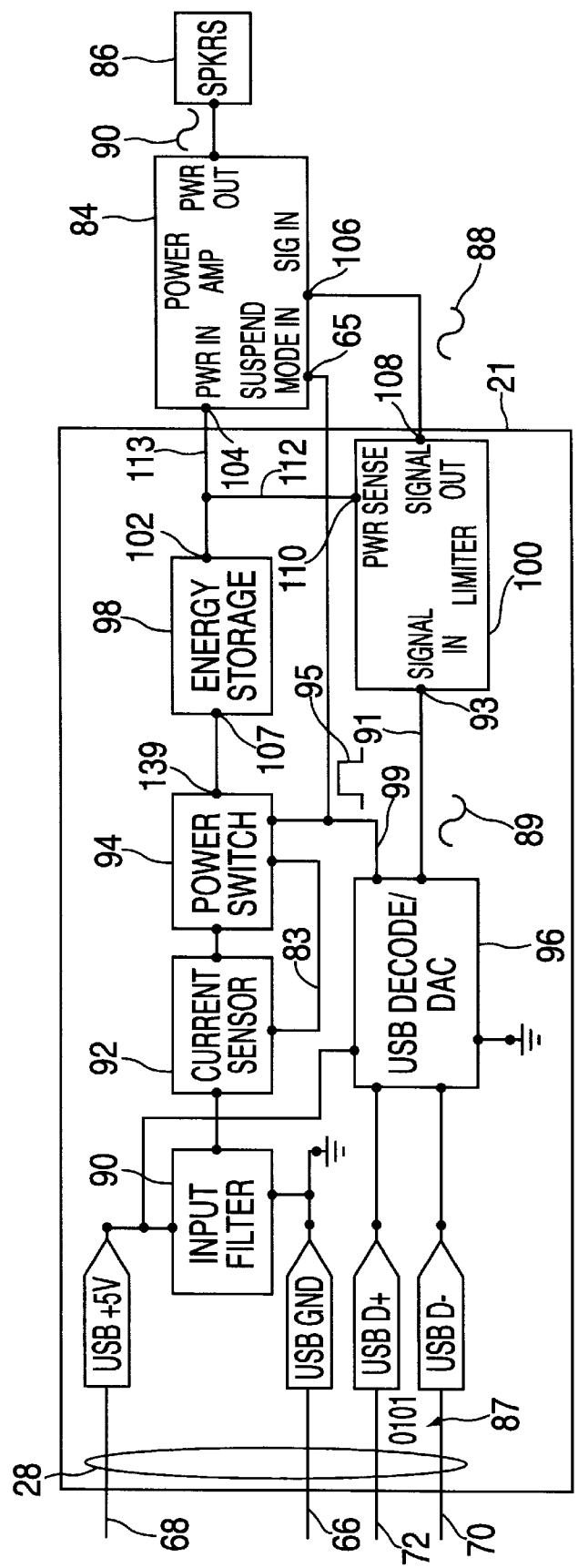
FIG. 7 is a functional block diagram of the USB speaker circuitry of the USB speakers of FIG. 6.

FIG. 7 shows a functional block diagram of the construction of USB speaker circuitry 21 in accordance with the present invention. Circuitry 21 includes input filter 90, current sensor 92, power converter 94, USB Decoder/DAC 96, energy storage device 98 and power output limiter 100. In brief, energy storage device 98 maintains a reservoir of power and provides this power at its output 102, which is also the output 113 of USB speaker circuitry 21, to the power input 104 of amplifier 84. USB speaker circuitry 21 takes advantage of the relatively low duty cycle of sound 77 (or at least the sound that one is likely to hear from computer speakers) to draw power from master USB hub 22 and store that power in energy storage device 98 at times when that power is not otherwise needed to power speakers 86.

Power amplifier 84 includes a signal input 106 that receives sound signal 88 from limiter 100 and uses power provided from energy storage device 98 to produced amplified sound signal 90.

Energy storage device 98 includes a power input 107 that draws electrical power from the power lines 66 and 68 of USB cable 28 (which connect to master USB hub 42) via the series combination of input filter 90, current sensor 92 and power converter 94. Input filter 90 connects across wires 68 (USB Vcc) and 66 (USB GND) to help prevent any electromagnetic interference generated by the other components of USB speaker circuitry 21 from propagating along wires 66 and 68. Current sensor 92 senses the current drawn by the components of USB speaker circuitry 21 and reports a measure of the current sensed to power converter 94 via control line 83.

Power converter 94 performs two main tasks. First, it either passes directly or converts the voltage and current received from wires 66 and 68 into a form suitable for charging energy storage device 98, the input 107 of which is connected to the power output 139 of power converter 94. In this task power converter 94 either transfers power directly to energy storage device 98 or acts as a power converter, converting the DC voltage and current received via power lines 66 and 70 into a new voltage and current more suitable for charging energy storage device 98. Preferably power converter 94 monitors the level of power stored in device 98, and only charges (or attempts to charge) device 98 when device 98 needs charging.

The second task performed by power converter 94 is that of a current limiter. Power converter 94 keeps USB speaker 22 acting as a "model USB citizen" by limiting the current drawn by USB speaker 22 to be less than or equal to the maximum currents allowed by the standard (i.e., 500 mA or less for a high power device, 100 mA or less for a low power device, and 500 microamperes or less in suspend mode). In particular, when USB speaker 22 is not operating in the suspend mode, power converter 94 responds to the current sensed by current sensor 92 and reported to power converter 94 via control line 83 by adjusting the power supplied to energy storage device 98 to an amount equal to or less than the maximum permissible current draw from master USB hub 42. When USB speaker 22 is in the suspend mode, preferably power converter 94 provides no power to energy storage device 98.

The sound signal 88 received by power amplifier 84 at its signal input 106 is derived from the digital data and control signal 87 conveyed by wires 70 and 72 of USB cable 28. Wires 70 and 72 provide signals 87 to USB Decoder/DAC 96, which decodes signals 87 into data and control signals. The protocol and decoding of signals 87 for the USB standard are well known to those skilled in the art, and so are not discussed in detail here. Other bus standards, such as IEEE 1394, will have different protocols and require suitably different decoding.

The possible control signals in signals 87 include a suspend mode control signal, which USB Decoder/DAC 96 decodes to produce as on output suspend mode signal 95. Signal 95 is conveyed by control line 99 to standby control input 129 of power converter 94. Preferably control line 99 also conveys suspend mode signal 95 to the suspend mode input 65 of power amplifier 84. The proper signal 95 orders power converter 94 and power amplifier 84 to enter the suspend mode.

Other portions of signals 87 representative of digital audio are converted with the aid of the DAC portion (not shown) of USB Decoder/DAC into analog sound signal 89. Sound signals 89 are conveyed via line 91 to limiter 100.

Limiter 100 receives sound signals 89 at its signal input 93. Limiter 100 monitors the level of the power stored in energy storage device 98 and controls amplifier 84 in a manner to optimize the use by amplifier 84 of the power stored in device 98. Preferably limiter 100 controls amplifier 84 by controlling the average level of sound signal 88 fed to input 106 of amplifier 84.

To sense this stored power, limiter 100 includes power sense input 110 that connects via line 112 to the output 102 of energy storage device 98. To control amplifier 84, preferably limiter conditions signals 89 in response to the amount of stored power to create sound signal 88, which is the signal input to amplifier 84.

One approach to optimizing the use of the power stored in energy storage device 98 is for limiter 100 to condition signal 89 by reducing the amplitude of signal 88 in response to a reduction in the power stored in energy storage device 98. This reduces the power consumption of amplifier 84 and speakers 86, since signal 88, and hence signals 90 and 77 are now of lesser amplitude and power than they otherwise would be.

Alternatively, limiter 100 could control the power consumption of amplifier 84 by controlling the gain of amplifier 84. This would involve a more complex connection between USB speaker circuitry 21 and amplifier 84 than merely controlling signal 88.

Reducing the power consumption of amplifier 84 and speakers 86 conserves the power in energy storage device 98 in the long run at the expense in the short run of less powerful sounds 77. One aspect of the current invention is how the USB speaker circuitry 21 optimizes this trade off in a manner as transparent as possible to people (not shown) listening to sounds 77. Various approaches are discussed in detail further below. One approach is to rely on test groups to listen to sounds 77 resulting from It particular configurations of limiter 100 and to implement the approach or approaches rated most favorably.

Another approach relies on computer 12 "pre-processing" signals 89 to generate relevant information about particular signals 89 in advance of master USB hub 22 sending the associated signals 87 to USB speaker circuitry 21. Such pre-processed information about signals yet to be decoded by USB Decoder/DAC 96 could be encoded in least-significant-bit data that are part of the USB data packets (not shown) in data signal 87 that describe the real time audio signal 89 in a manner that would be inaudible and would not interrupt the transmission of data signal 87. In this manner, limiter 100 can be configured based on the current level of power storage in energy storage device 98 and the known future characteristics of sound signals 89.

Alternatively, relevant information about particular signals 89 could be assigned by software (not shown) resident in host computer 12 to an isochronous (equally spaced in time) data transmission slot (not shown) in data signal 87. The slot for this signal information could be positioned next to the slot for the digitized audio information (not shown) that the signal information describes. A hybrid approach would allow the host computer 12 to alternate between least significant bit encoding and using a slot to send the signal information to USB speakers 22, depending on whether the currently available bandwidth of the USB bus allowed for using a slot to send the signal information.

In another aspect of the present invention, the calculations needed to configure limiter 100 based on advance information on the characteristics of signals 89 are performed by either computer 12 or by a microcontroller (not shown) embedded in USB Decoder/DAC 96.

Figure 20:
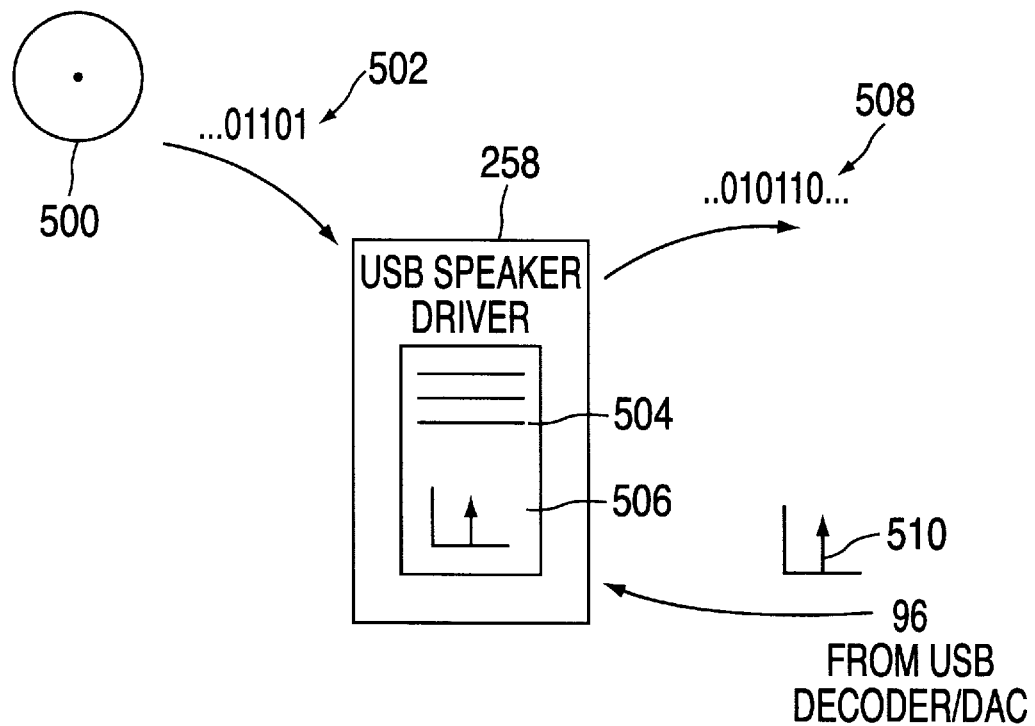
FIG. 20 is a pictorial representation of an implementation of the present invention in software resident on the host computer of FIG. 1.

In another aspect of the present invention, referring now to FIG. 20, software 258 resident in host computer 12 reads the signal 502 from a signal source such as CD 500, and calculates its equivalent signal level 506, receives from USB speaker circuitry 21 a report on the energy stored in energy storage device 98, and calculates a new signal 508 to replace signal 502 that is a function of the stored energy in device 98 and the level of signal 502.

Another aspect of the present invention is how USB speaker circuitry 21 responds to command signals from master USB hub 22 to enter and exit the suspend mode. A listener (not shown) to sounds 77 will expect to hear sounds 77 shortly after performing whatever acts are necessary to computer system 10 to "turn on" USB speakers 22. That is, the listener expects the warm up time of USB speakers 22 to be fairly short. Similarly, the listener expects USB speakers 22 exiting the suspend mode to have a fairly short warm up time. However, there is a trade off between the ability of USB speakers 22 to quickly warm up after exiting the suspend mode and the ability of USB speakers 22 to conserve power stored in the energy storage device 98 during suspend mode.

Figure 6:
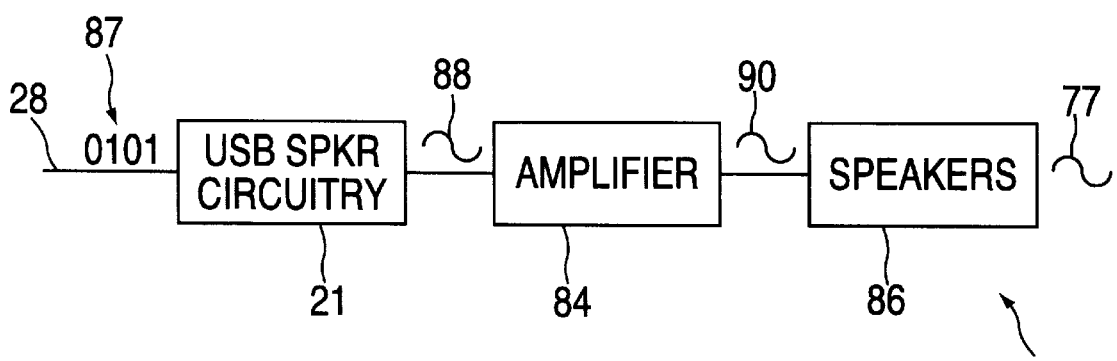
FIG. 6 is a functional block diagram of the USB speakers of FIG. 1.
Figure 8:
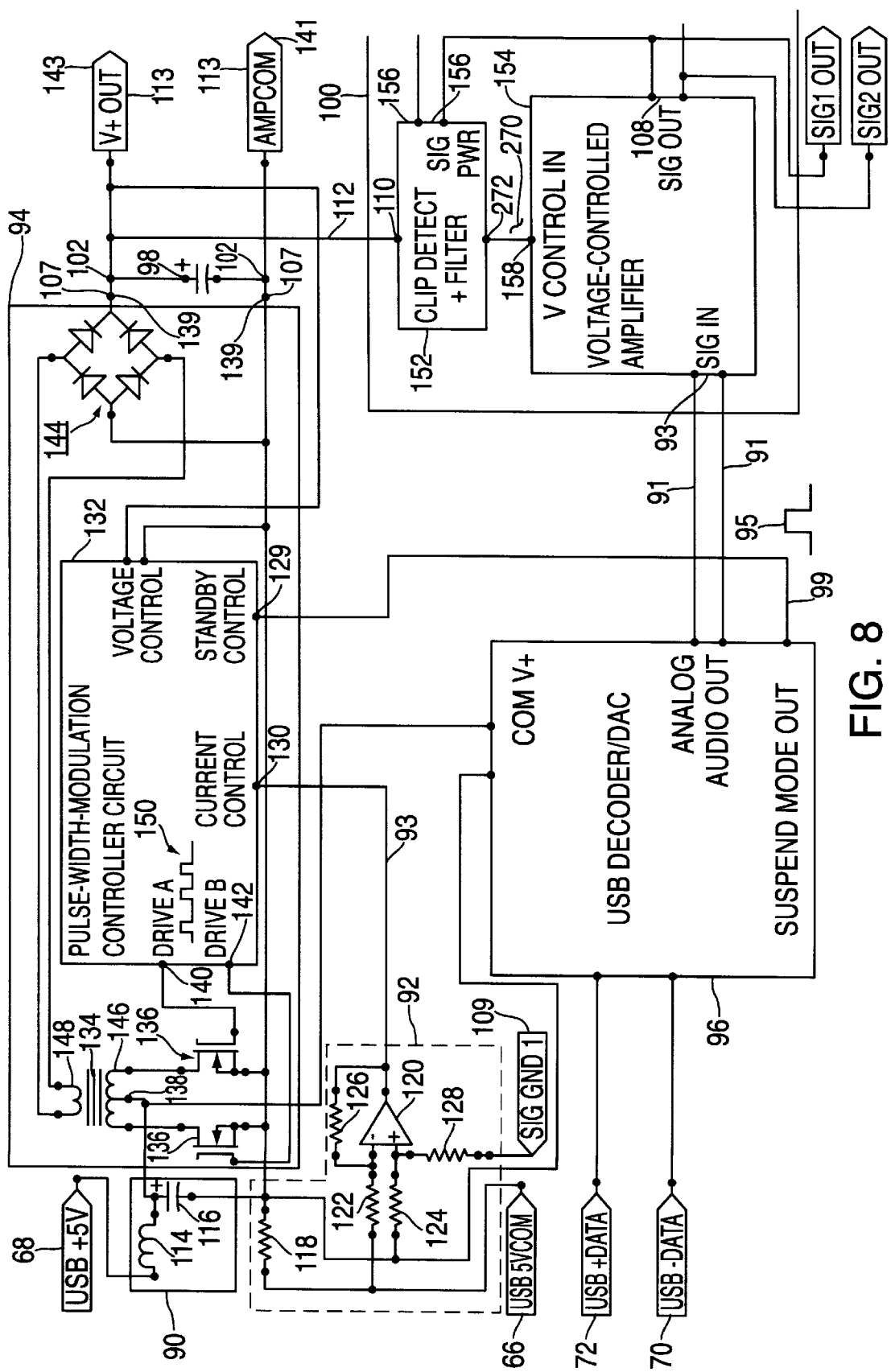
FIG. 8 is a schematic diagram of a preferred embodiment of the USB speaker circuitry of FIG. 7.

Bus Powered Interface that Implements the Power Converter Using a Transformer Coupled to a Pair of Transistors Driven by a PWM Signal Referring now to FIGS. 6, 7, 8 and 16, in FIG. 8 there is shown a first preferred embodiment of the basic USB speaker circuitry 21 of FIG. 6. Connected across USB Vcc 68 and USB GND 66 are the series combination of inductor 114, capacitor 116 and current sensing resistor 118. Inductor 114 and capacitor 116 form input filter 90. Preferably inductor 114 is about 1.0 micro henry and capacitor 116 is limited to 10 microfarads by the USB specification.

Current sensing resistor 118 is part of current sensor 92, which further consists of operational amplifier 120 and its associated resistors 122, 124, 126 and 128. Op Amp 120 and associated resistors 122, 124, 126, and 128 form a differential amplifier, and as connected to current sense resistor 118, output 81 is a voltage proportional to the current flowing through resistor 118. Op Amp 120 and associated resistors 122,124, 126 and 128 may be connected to additional components (not shown) that add a fixed voltage to the voltage of output 81 so as to facilitate the use of this voltage by current control input 130 of PWM controller circuit 132.

One end of resistor 128 is connected to the non inverting terminal of Op Amp 128 and the other end forms signal ground 109, which is the ground for the signals 88 fed into amplifier 84. Resistor 126 is connected between the output of Op Amp 120 and its inverting input to provide feed back to Op Amp 120. Resistor 122 is connected at one end to USB GOD 66 and to one end of resistor 118, and at the other end to the inverting input of op amp 120. Resistor 124 is connected at one end to the other end of sensing resistor 118 and the negative pole of capacitor 116, and at the other end to the non-inverting input of Op Amp 120.

In this manner the current flow through sensing resistor 118 produces a voltage proportional to the current flow, and this voltage is conveyed by resistors 122 and 124 to input terminals of Op Amp 120. Op Amp 120 amplifies the voltage and outputs the amplified voltage at output 81. Output 81 is connected via signal via line 83 to the current control input 130 of pulse-width modulation (PWM) controller 132 of power converter 94.

Alternatively, the voltage across current sensing resistor 118 can be determined using switched-capacitor circuitry (not shown) for sensing the voltage across sensing resistor 118 and translating it to a new reference voltage level suitable for use at current control input 130 of controller 132. Similarly, Op Amp 120 and associated resistors 122, 124, 126 and 128 can be replaced by a suitable integrated differential amplifier, also known as a instrumentation amplifier (not shown). Another approach uses an integrated circuit self-contained current sensor (not shown), which incorporates the equivalent of sensing resistor 118 and additional circuitry to produce an output voltage suitable for use at current control input 130.

Other inputs to PWM controller 132 include standby control 129 and voltage control 131. Standby control 129 is used to order power converter 94 into the suspend mode of the USB standard, as discussed further below. Voltage control 131 connects to the energy storage device 98 to monitor the power stored by device 98. Among other things, PWM controller 132 can monitor the power stored in device 98 to determine when device 98 has reached (or is about to reach) its power storage limit. In response, PWM controller 132 can reduce or halt efforts by power converter 94 to charge energy storage device 98.

In addition to PWM controller 132, power converter 94 includes primary center tap transformer 134, two power MOSFETs 136 and full wave bridge rectifier circuit 144. In brief, PWM controller 132 produces a pulse width modulated signal 150 in response to the current sensed by current sensor 92 and in response to the power monitored in energy storage device 98 by voltage control input 131. Signal 150 and its complement are used to drive respective MOSFETs 136 to produce an alternating signal across the primary windings 146 of transformer 134. The secondary windings 148 of transformer 134 are connected to a full wave bridge rectifier 144. Rectifier 144 converts the alternating voltage to a DC voltage, which is then applied across energy storage device 98 to charge it.

In particular, signal 150 and its inverse are conveyed by drive A output 140 and drive B output 142, respectively, of PWM controller 132 to the respective gates of the two MOSFETs 136. The drain of each MOSFET 136 is connected to a different end tap of the primary winding 146. PWM controller includes drive output A 140 and drive output B 142 that convey the pulse width modulated signal 150 produced by PWM controller 132 and its complement, respectively, to the gate connections of a different one of MOSFETs 136. The center tap 138 of the primary winding 146 of transformer 134 is connected to the junction of filter inductor 114 and filter capacitor 116 to filter the signal to and from transformer 134. Each MOSFET 136 is configured as a common-source shunt switch, with the internally-connected source and substrate connected to the ground line Ampcom 141 of the output 102 of energy storage device 98.

The alternating pulses of signal 150 cause MOSFETs 136 to produce the alternating current voltage across the primary winding 146 that allow the transformer 134 to step up that voltage. The ratio of primary winding 146 to secondary winding 148 of transformer 134 is preferably about 6 to 1 to allow for less than 50% duty cycle pulses 150 from drive A 140 and drive B 142 so that alternate switching of MOSFETs 136 (which impress 5 volts across each half of primary winding 146) to produce about 50 V peak-to-peak across secondary winding 148.

In this and in other embodiments of the present invention, MOSFETs 136 can be replaced by various other switching devices, including but not limited to bipolar transistors, IGBTs (Insulated Gate Bipolar Transistors), thyristors (e.g., SCRs, TRIACs, gate-turn-off devices), vacuum tubes, triggered spark gaps (with attendant electromagnetic interference issues) and electromagnetic relays.

In operation, PWM controller 132 senses the voltage (which is a proxy for power storage) across energy storage device 98 via voltage control input 131 and attempts to maintain this voltage at a predetermined level that represents the maximum desired stored energy in device 98 (e.g., about 50 volts for the particular device 98 used here). PWM controller 132 tries to maintain the predetermined voltage level while maintaining no more than a 500 mA or 100 mA drain from USB Vcc 68 (in the case of the operation of USB speakers 22 as a high power device and a low power device, respectively).

Ground line Ampcom 141 is also connected to the junction of filter capacitor 116 and sensing resistor 118, and serves as the ground for amplifier 84 and for the signals 88 entering amplifier 84 at its signal input 106. Energy storage device output 102 also includes output power line V+Out 143.

Energy storage device 98 is preferably a capacitor. In the particular design illustrated, capacitor 98 is between 10,000 and 20,000 microfarads and rated to handle the 50 V power provided by power converter 94. Alternatively, capacitor 98 could have another value, either a greater or lesser capacitance, or rated to handle a greater or lesser voltage than 50 V (with power converter 94 similarly suitably adapted to provide the greater or lesser voltage).

Figure 25:
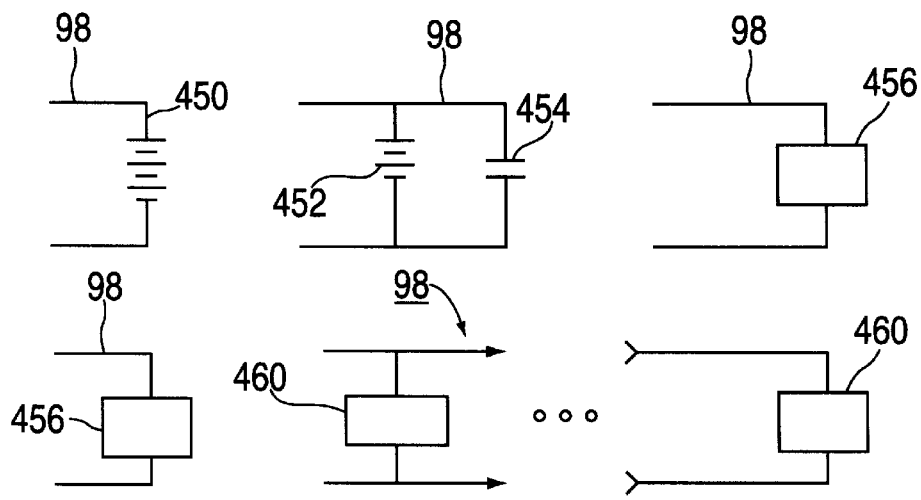
FIG. 25 is a pictorial representation of alternatives for the energy storage device of FIG. 7 embodying the present invention.
Figure 23:
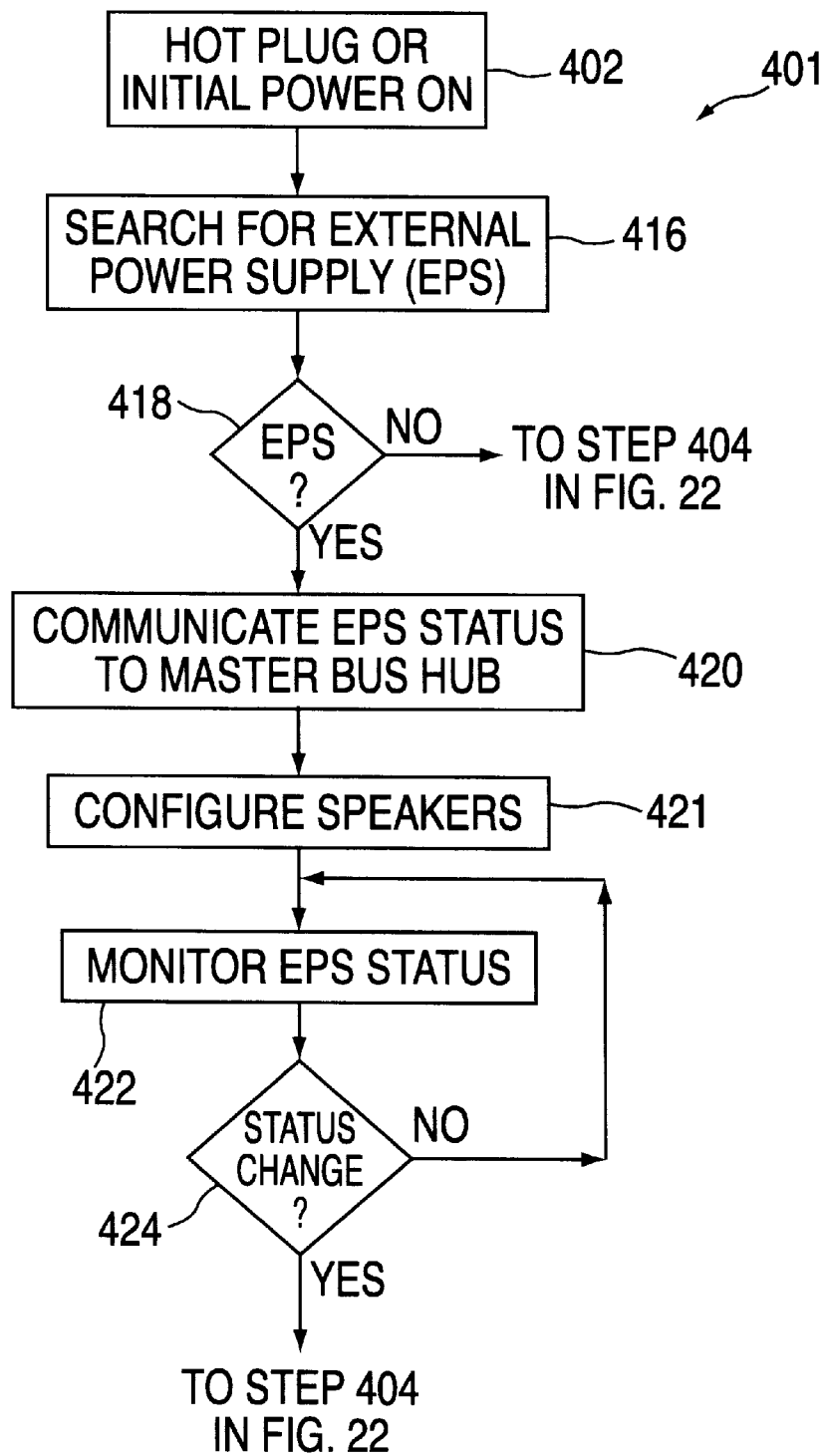
FIG. 23 is a flow chart of a modification of the software routine of FIG. 22 that determines if the USB speakers of FIG. 1 are powered by an external power supply.

Alternatively, referring now to FIG. 25, energy storage device 98 can be a rechargeable battery 450, a rechargeable battery 452 in parallel with a capacitor 454, an electromechanical energy storage device 456 (such as a flywheel (not shown) turning an electric generator (not shown) with the flywheel turned by an electric drive motor (not shown) powered by power converter 94), a magnetic storage device 458 (such as the magnetic field of a superconducting magnet (not shown), or more than one type of energy storage device 460 used in combination to form a hybrid device 98.

The capacitance and voltage values of capacitor 98 were chosen taking into account several factors. These factors include the cost of the capacitor, the limitations on the ease of use of energy at a high voltage for feasible transducer impedances, overall system cost and the potential for shock hazards at higher voltages. Energy stored in a capacitor is directly proportional to the capacitance and to the square of the voltage across the capacitor. Since that energy storage capability increases more rapidly than the physical size and cost as the rated voltage increases, higher voltage capacitors of a given cost and physical size are favored in choosing the energy storage device 98.

The relatively large power supply capacitor 98 provides energy storage and thus the amplifier 84 can pull high surge currents for musical/sound effect peaks for useful durations without having the USB speakers 22 exceed the USB standard current drain specification. In particular, USB speakers 22 embodying the current invention can operate on musical material at an average power of $\frac{1}{8}^{th}$ of peak power continuously and sound for all intents and purposes as if amplifier 84 was a much higher power amplifier. This operation is particularly effective for amplifiers 84 of the switch mode type ("class D") and thus nearly 100% efficient in converting the D.C. power provided by energy storage device output 102 into sound signal 90.

Limiter 100 includes clip detect and filter 152 and voltage controlled amplifier (VCA) 154. VCA 154 receives sound signal 89 on line 91 at its signal input 93, conditions signal 89 and outputs the conditioned signal as signal 88 from signal output 108. Preferably signals 89 and 88 are stereo signals.

VCA 154 is controlled by clip detect and filter 152. Clip detect and filter 152 includes power sense input 110 which senses the output power of energy storage device 98 via sense line 112. More particularly, clip detect and filter 152 senses the voltage across capacitor 98, which is an indication of the energy stored in capacitor 98. Clip detect and filter 152 also includes signal power input 156, connected to the signal output 108 of VCA 154, that senses the power of the stereo signals 88 from signal output 108 of VCA 154.

Clip detect and filter 152 conditions signals 89 in response to the power of the stereo signals 88 and the voltage across capacitor 98. Under heavy loading of capacitor 98 by amplifier 84, the voltage across capacitor 98 will fall below a predetermined set point in clip detect and filter (e.g., 40 V). In response, clip detect and filter 152 determines the appropriate voltage to input to the voltage control input 158 of VCA 154. This voltage is a function of the two voltages sensed by clip detect and filter 152, the voltage across capacitor 98 and the voltages across stereo signal output 108, and is constructed so as to prevent sustained clipping distortion at the output 90 of the power amplifier 84.

Figure 16:
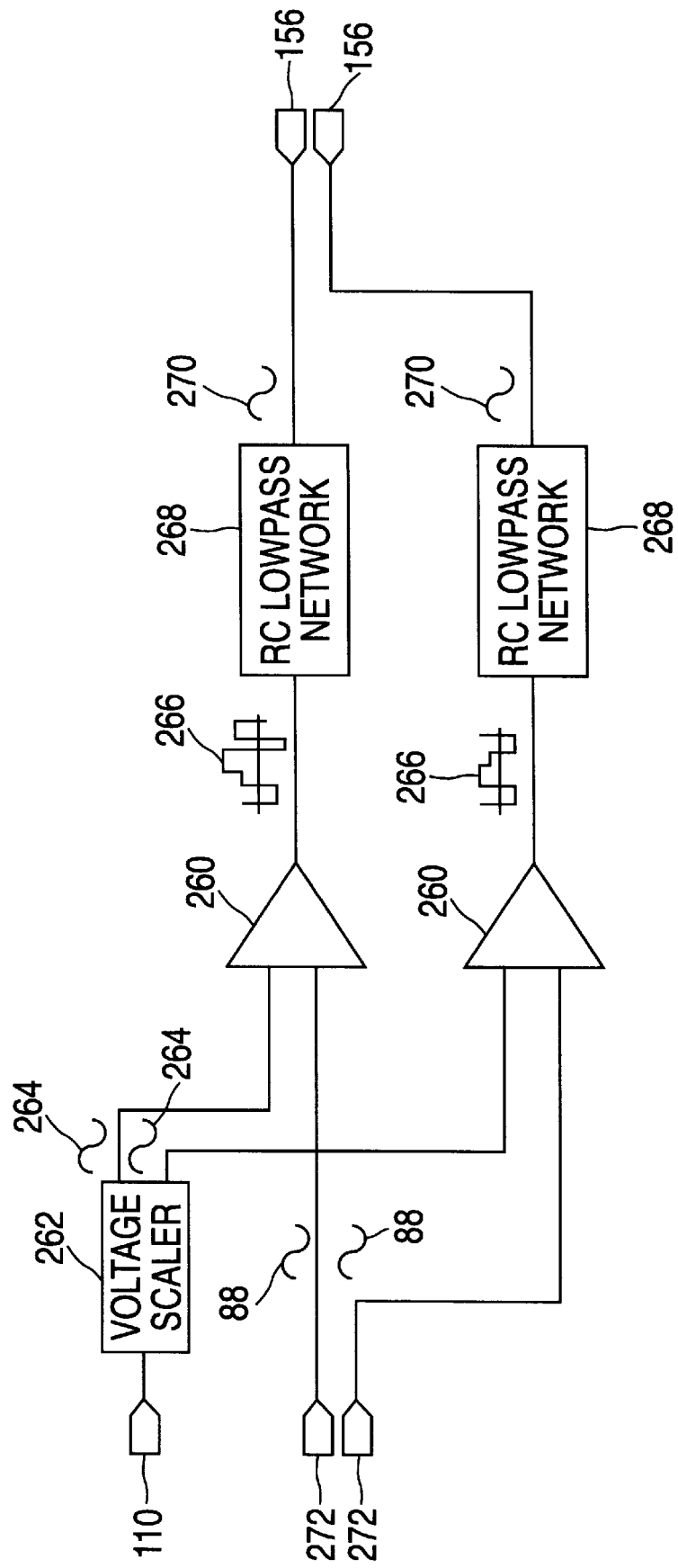
FIG. 16 is a functional block diagram of one implementation of the Clip Detect and Filter of FIGS. 8, 9, 10 and 15.

Referring now to FIG. 16, there is shown a preferred implementation of clip detect and filter 152. Filter 152 includes a voltage scaler 262. For each sound channel (e.g., a typical stereo signal has two sound channels), filter 152 also includes a voltage comparator 260 and a network filter 268. Voltage scaler 262 has input 110 that connects to the output of capacitor 98 to receive a voltage signal representative of the power stored in capacitor 98. The range of this signal depends on the operating voltage of capacitor 98 (e.g., 0 to 50 volts). Voltage scaler 262 scales the voltage from capacitor 98 to a range suitable for working with the other components of filter 152. For example, if the voltage across capacitor 98 is designed to range from 0 to 50 volts, scaler 262 preferably would generate a scaled signal 264 with a range from 0 to 5 volts, a linear reduction by a factor of 10. This could be accomplished using a simple resistive voltage divider. Other techniques to scale voltages would be well known to one skilled in the art.

Signal 264 is fed into one input of each comparator 260. The other input of each comparator 260 is signal power input 156. Signal power input 156 is connected to the signal output 108 of VCA 154, and senses the power of the stereo signals 88 from signal output 108 of VCA 154. Each comparator 260 compares the scaled signal 264 to the signal 88 it receives and produces a pulsating D.C. signal 266 of one or the other polarity. Comparator output signal 266 has an average value that is proportional to the amount by which signal 88 would produce clipping or other signal distortion were it to be amplified by amplifier 84 and reproduced by speakers 86.

From the output of its comparator 260, pulses 266 are filtered by a filter 268. Each filter 268 has filter characteristics chosen to provide for the most satisfactory psychoacoustic behavior on music and sound effect material (i.e., the types of material most likely to be played over computer speakers 22). The output 272 of each filter 268 is a fluctuating D.C. voltage signal 270 which is fed to VCA input 158.

Preferably each filter 268 is a relatively low cost resistor/capacitor low pass network arranged so that the characteristics of filter 268 optimize attack and decay of pulses 266 (i.e., filter 268 characteristics have different time constants for the onset and the removal of pulses 266). Alternately, each filter 268 could be an active filter of any suitable type well known to those skilled in the relevant art.

To accurately measure and control the current drawn by USB speaker 22, the placement of sensing resistor 118 is particularly important. In the position described, sensing resistor 118 senses all of the current drawn by the various components of USB speaker 22. That is, through resistor 118 flows all of the current from USB Vcc 68 and USB GND 66 to USB speaker 22 (including all of the current used by USB speaker circuitry 21, amplifier 84 and speakers 86, and their subcomponents, such as power converter 94). An equivalent function (not shown) places resistor 118 in series with USB Vcc 68 and input filter inductor 114 (i.e., on the voltage input USB Vcc 68 rather than on the ground return USB GND 66) to measure the total current consumed by the various components of USB speaker 22.

Alternatively, resistor 118 can be placed such that it does not sense the power consumed by certain components, such as USB Decoder/DAC 96. This is not desirable, and should only be done for components having power consumptions that are well known and relatively constant or otherwise well behaved (e.g., power consumptions that fluctuate in a known manner). Of course, the current limit threshold used by PWM controller 132 must be reduced by an amount equal to or greater than the known performance of the components excluded from the current sensing of resistor 118.

In designing Op Amp 120 and its associated resistors 122,124,126 and 128 particular attention must be paid to resistor tolerances, as well as to the intrinsic offset voltage error of op amp 120. Similarly, sensing resistor 118 should be a resistor of suitable tolerance to minimize errors in sensing the current drawn by USB speakers 22.

One alternative technique for monitoring the current drawn by USB speakers 22 is to replace resistor 118 with an inductor (not shown) having an inductance that is a function of D.C. current and to measure and report the change in inductance. Another alternative technique is to replace resistor 118 with a Hall effect sensor (not shown) and to measure and report the quasi-static magnetic field associated with a current-carrying conductor.

In this embodiment, if one of the two MOSFETs 136 is not used (i.e., left out of the circuit to reduce the part count and simplify the design) and the remaining MOSFET 136 and associated circuitry other wise operates as described above, the resulting circuit is a Flyback converter.

Figure 9:
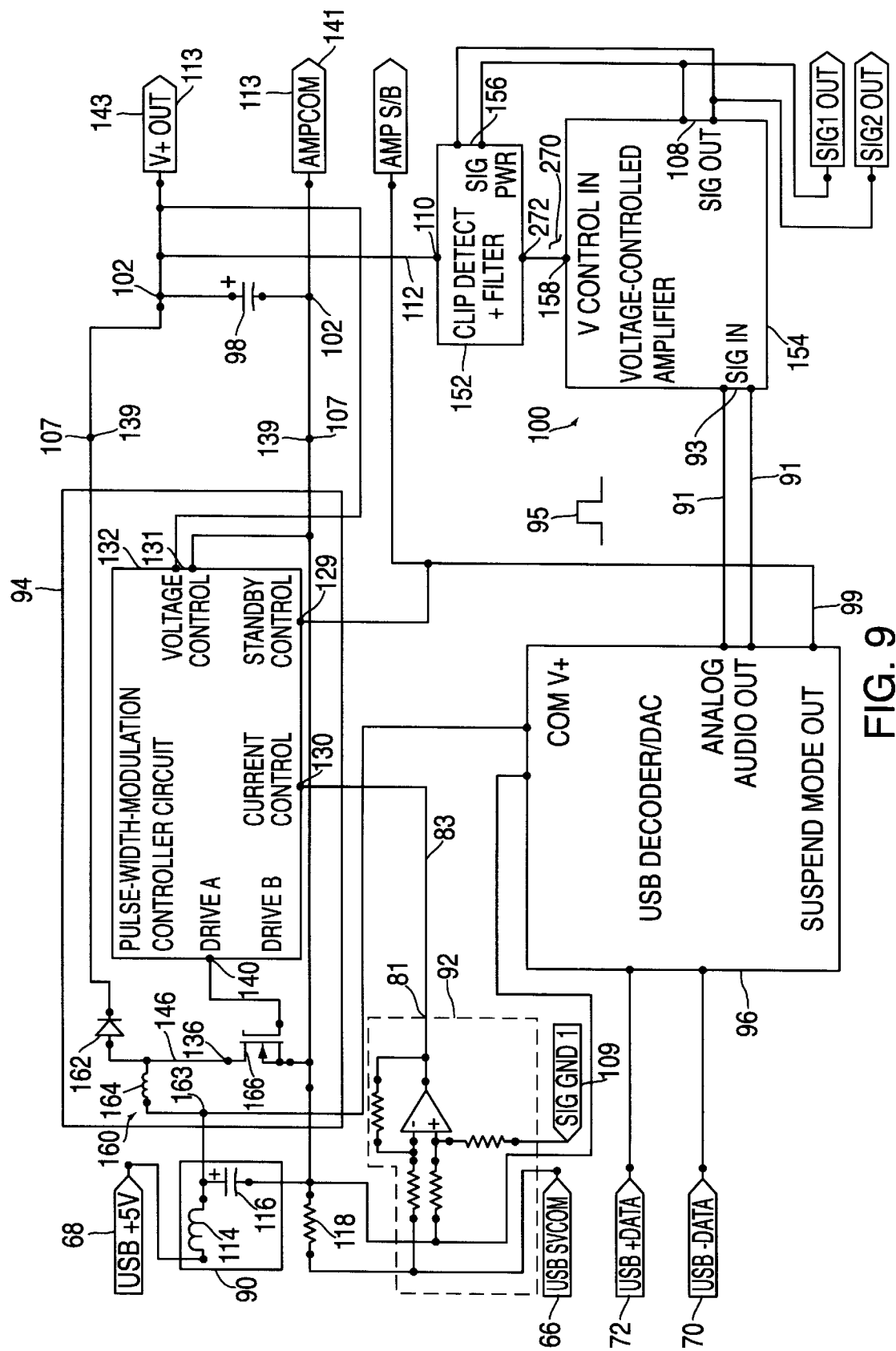
FIG. 9 is a schematic diagram of an alternate implementation of the power switch component of the USB speaker circuitry of FIG. 7 in which a Boost Converter is employed.

Bus Powered Interface that Implements the Power Converter Using a Boost Converter Referring now to FIGS. 7 and 9, in FIG. 9 there is shown a second embodiment of the USB speaker circuitry 21 of the present invention. The transformer 134 and dual MOSFET 136 implementation of power converter 94 of FIG. 8 is replaced by a Boost Converter 160. Otherwise the components and operation of USB speaker circuitry 21 is essentially unchanged.

Boost Converter 160 includes inductor 164, diode 162 and MOSFET 166. The gate of MOSFET 166 is connected to the drive A output 140 of PWM controller 132. Drive B output 142 is not used. The internally connected source and substrate of MOSFET 166 are tied to amplifier ground line Ampcom 141. The drain of MOSFET 166 is tied to the junction 163 that includes one terminal of inductor 164 and the anode of diode 162. The other terminal of inductor 164 is tied to the junction between filter inductor 114 and filter capacitor 116. The cathode of diode 162 is connected to the positive terminal of capacitor 98.

In operation, positive going pulses from drive A output 140 of PWM Controller 132 are applied to the gate of MOSFET 166, causing junction 163 to be grounded periodically. In response, at the beginning of each positive going pulse from output 140, inductor 164 conducts a current that linearly increases as a function of time. The duration of each pulse determines the amount of energy stored in inductor 164 at the end of that pulse. At the end of a pulse, inductor 164 releases its stored energy as diode 162 becomes forward-biased, thereby charging capacitor 98 at a voltage greater than the voltage boost converter 160 receives at USB Vcc 68.

Preferably inductor 164 is about 2 to 3 micro henries for proper operation of Boost Converter 160 using pulses from drive A output 140 having a frequency of operation in the few hundred kilohertz range. Preferably inductor 164 is the toroidal type to minimize EMI radiation. For smaller or larger inductance values of inductor 164, a designer would adjust the frequency of pulses from drive A output 140 higher or lower, respectively.

In designing Boost Converter 160, care must be taken to make sure that inductor 164 has transferred all of its stored energy to capacitor 98 before the next positive drive pulse from drive A output 140 to the gate of MOSFET 166. Otherwise, the inductor 164 can saturate and overload MOSFET 166. Use of a Boost Converter 160 also requires that the power amplifier 84 be able to go into a zero-current drain state in the Suspend mode.

Figure 10:
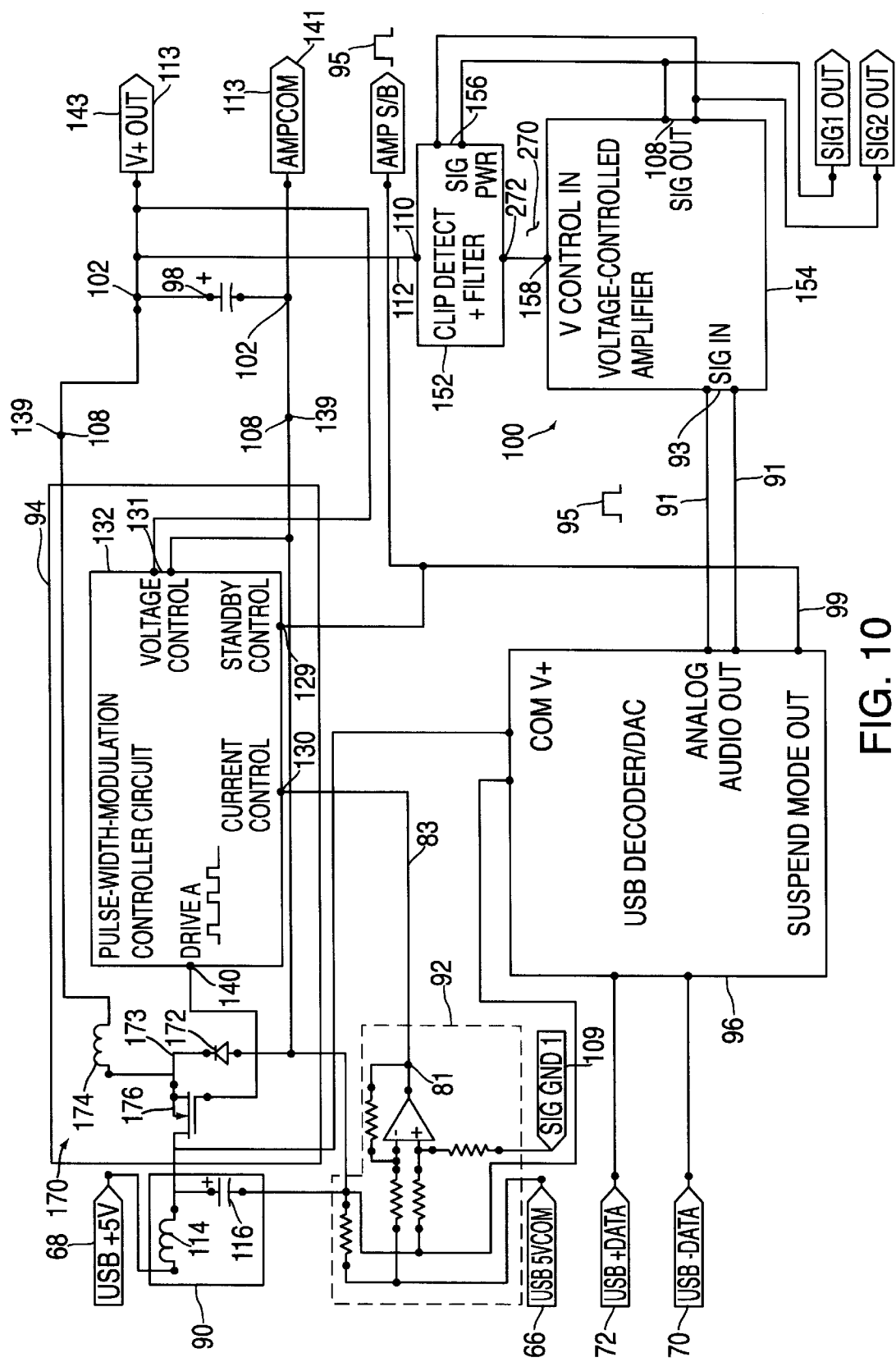
FIG. 10 is a schematic diagram of another alternate implementation of the power switch component of the USB speaker circuitry of FIG. 7 in which a Buck Converter is employed.

Bus Powered Interface that Implements the Power Converter Using a Buck Converter Referring now to FIG. 10, in this embodiment, capacitor 98 has a lower voltage (6.3 V versus 50 V) but a higher capacitance (250,000 microfarads versus 10,000 to 20,000 microfarads for the power converter 94 of FIG. 8 and 10,000 microfarads for the power converter 94 of FIG. 9). A Buck Converter 170 replaces the Boost Converter of FIG. 9 and the transformer 134 and dual MOSFET 136 implementation of power converter 94 of FIG. 8. Otherwise the components and operation of USB speaker circuitry 21 is essentially unchanged.

Buck Converter 170 includes inductor 174, diode 172 and MOSFET 176. The gate of MOSFET 176 is connected to drive A output 140 of PWM controller 132. The drain of MOSFET 176 is connected to the positive terminal of filter capacitor 116. The internally connected source and substrate of MOSFET 176 are connected to one terminal of inductor 174 and to the cathode of diode 172 at junction 173. The other terminal of inductor 174 is connected to the positive terminal of capacitor 98, which also serves as the V+ OUT terminal 143 of USB speaker circuitry power output 102. The anode of diode 172 is connected to amplifier ground Ampcom 141.

In essence, Buck Converter 170 transfers energy from the USB power connections 68 and 66 to the energy storage capacitor 98. In contrast to Boost Converter 160 (shown in FIG. 9), Buck Converter 170 charges capacitor 98 with a voltage that is always less than the voltage received from USB Vcc 68 (i.e., always less than 5 v).

In operation, a positive going pulse from drive A output 140 causes MOSFET 176 to turn on, allowing current to flow through to inductor 174. Inductor 174 performs short term energy storage and limits the amount of current that otherwise would flow from USB power connections 66 and 68 and capacitor 116 to energy storage capacitor 98. When the pulse from output 140 goes low, MOSFET 174 turns off and inductor 174 causes the voltage at junction 173 to swing negative until diode 172 becomes forward-biased and clamps the voltage at junction 173 to a level slightly below the level at USB GND 66. The energy in inductor 174 then flows into energy storage capacitor 98. Important to the operation of Buck Converter 170 is for PWM Controller 132 to regulate the duty cycle of the pulses from drive A output 140 so as to never draw more than the maximum current permitted by the USB specifications.

Preferably inductor 164 is in the range of 3 micro henries and is of the toroidal type to minimize EMI (e.g., stray fields that could interfere with other circuitry). For smaller or larger inductance values of inductor 174, a designer would change the average operating frequency of the positive going pulses from drive A output 140 of PWM Controller 132 to be higher or lower, respectively.

In designing Buck Converter 170, care must be taken to make sure the feedback loop involving voltage and current control is dynamically stable and that the response to load or line fluctuations is free from "ringing" or other instabilities well known to those skilled in the art. Care should also be taken in design not to exceed the current ratings of diode 172, MOSFET 176 and inductor 174.

Bus Powered Interface that Implements the Power Converter Using a Linear Current Device Referring now to FIGS. 7 and 16, in FIG. 16 there is shown a fourth embodiment of the USB speaker circuitry 21 of the present invention. The transformer 134 and dual MOSFET 136 implementation of power converter 94 of FIG. 8 is replaced by a Linear Current Device 312, which is controlled by controller 132. Linear Current Device 312 includes MOSFET 314, which has its gate connected to drive A output 140 of controller 132, its drain connected by line 316 to the positive terminal of capacitor 98, and its internally connected substrate and source connected to the junction between filter inductor 114 and filter capacitor 116. Controller 132 includes a single control signal output, drive A output 140, that outputs control signal 151. Capacitor 98 is preferably in the range of 250,000 microfarads and rated to handle at least 6.3 volts. Otherwise the components and operation of USB speaker circuitry 21 is essentially unchanged.

In operation, in response to the voltage (which is proportional to the current flowing through current sensing resistor 118) from current sense output 81 received at current control input 130, controller 132 varies the voltage signal 151 supplied by drive A output 140 to the gate of MOSFET 314 to increase or decrease the source-to-drain resistance of MOSFET 314. With higher source-to-drain resistance, less current is transferred to energy storage device 98 from USB bus 28 power lines 66 and 68 and with lower source-to-drain resistance more current is transferred. Controller 132 supplies a voltage signal 151 calculated to adjust the source-to-drain resistance of MOSFET 314 to prevent the current drawn from power line 66 from exceeding 100 mA (low power mode) or 500 mA (high power mode). When the standby control input 129 of controller 132 receives from the appropriate suspend mode signal from the suspend mode output 99 of USB Decoder/DAC 96, controller 132 generates a signal 151 to make the source-to-drain resistance of MOSFET 314 very large, reducing the current drawn from power line 68 to nearly zero, allowing USB speaker 22 to meet the USB standard requirement of drawing less than 500 microamperes of current in the suspend mode.

Capacitor 98 is chosen to provide sufficient energy storage so as to minimize the change in voltage across power outputs Ampcom 141 and V+Out 143 (the output 102 of capacitor 98 and the output 113 of USB speaker circuitry 113) in response to short-term high-current demands from the amplifier 84, which has the practical effect of allowing USB speakers 22 to satisfy intermittent peak levels of sound signals 88 and 90 (e.g., music and/or sound effects) substantially in excess of the average power required by such signals 88 and 90. The value of capacitor 98 is a compromise that factors cost, voltage change minimization, the expected duration time of peak levels of signals 88 and 90, and the time a capacitor 98 of a particular value would need to recover after a given amount of power discharge. The smaller the capacitance value of capacitor 98, the quicker it would acquire a full charge but the lesser its ability to sustain high current demands from amplifier 84 (or other load).

Figure 11:
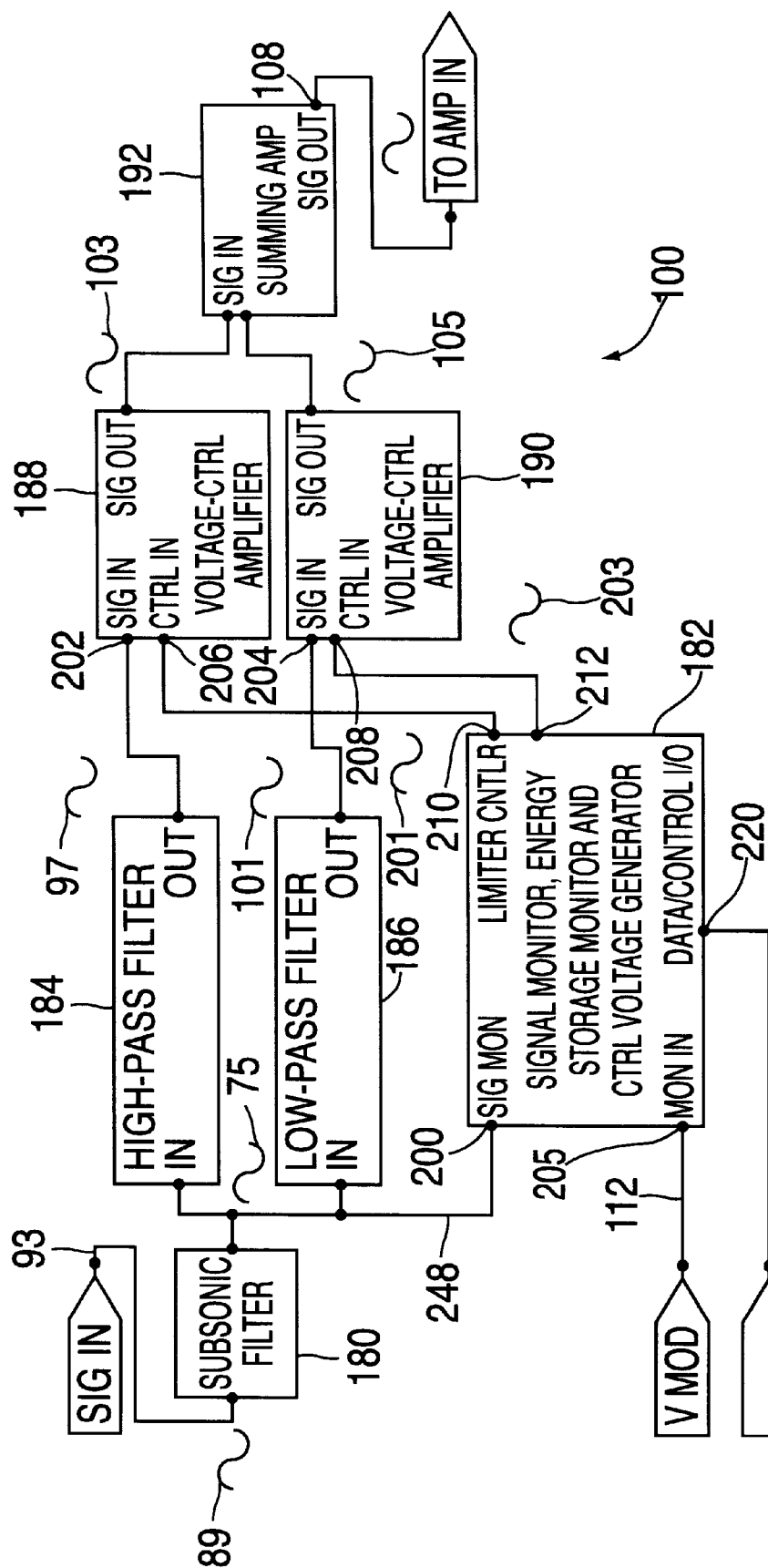
FIG. 11 is a functional block diagram of an alternative implementation of the limiter of FIG. 7.
Figure 15:
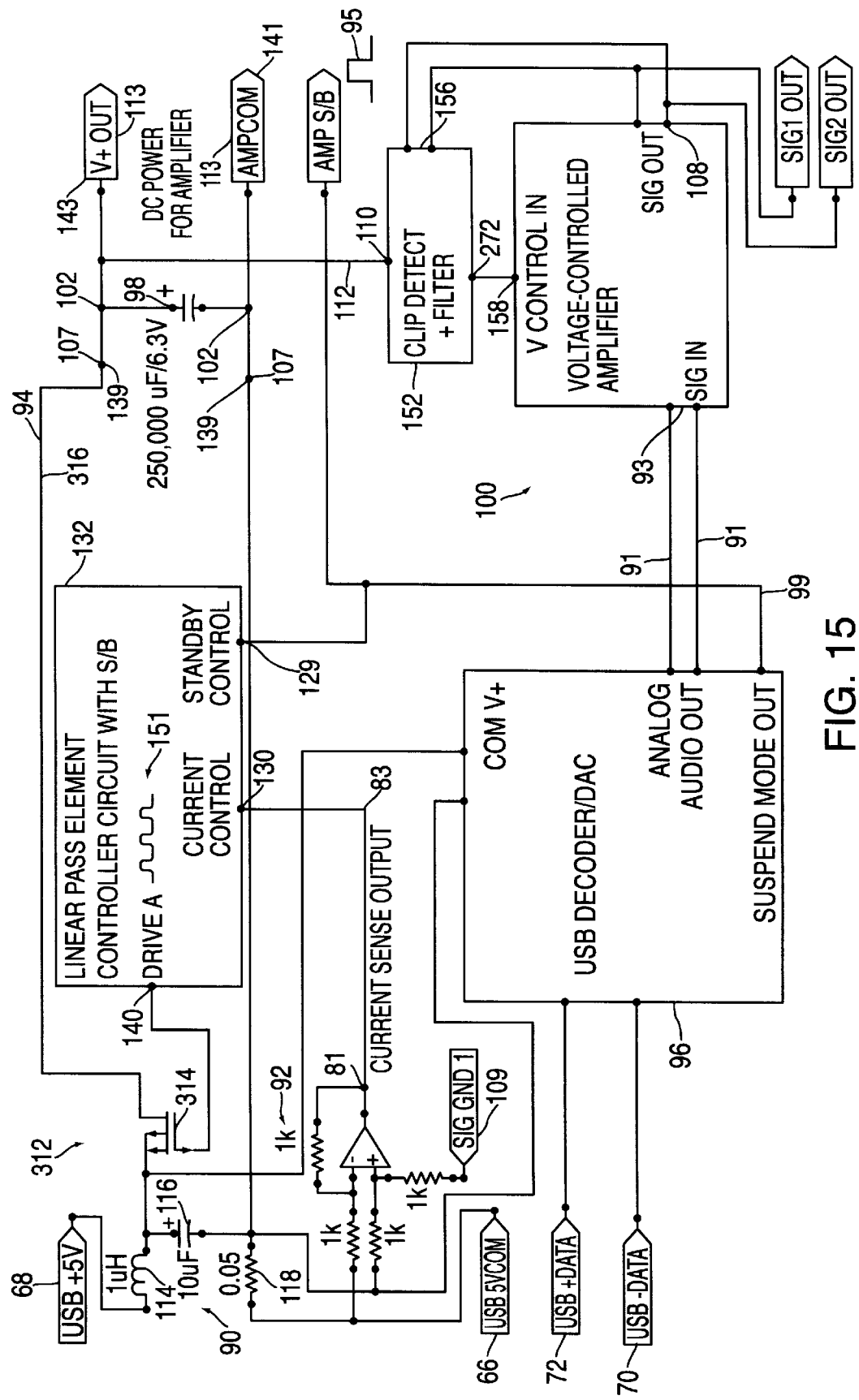
FIG. 15 is a schematic diagram of an alternate implementation of the power switch component of the USB speaker circuitry of FIG. 7 in which a Linear Pass Element is employed.

Bus Powered Interface Using a Hardware Implementation of Frequency Band Type Limiter Referring now to FIGS. 7 and 11, FIG. 11 depicts an alternative construction of a limiter 100 embodying the current invention. In brief, this limiter 100 filters out subsonic frequencies of signal 89, splits the filtered signal 75 into two or more frequency bands 184 and 186, adjusts each frequency band signal 97 and 101 in amplitude based on its original amplitude and the level of stored energy in energy storage device 98, then sums the adjusted frequency band signals 103 and 105 then feeds the summed signal 111 to the signal input 106 of amplifier 84. In this manner, limiter 100 produces signal 88 from signal 89 as a function of the energy stored in device 98 and the energy in signal 89.

To this end, for each channel of sound signal (e.g., stereo will have two channels, left and right), limiter 100 includes a subsonic filter 180, respective high pass and low pass filters 184 and 186, respective high pass and low pass voltage controlled amplifiers (VCAs) 188 and 190, a summing amplifier 192, and a limiter controller 182 that controls the amplification of each VCA 188 and 190 based on the signal 75 from the subsonic filter 180 and the energy level in the energy storage device 98. In operation, signal 89 enters limiter signal input 93 to be filtered by subsonic filter 180. Typically subsonic filter 180 is a high pass filter that filters out frequencies below about a predetermined threshold in the range of about 20 to 300 Hertz, with 80 Hertz being a typical value for speakers employed with computers.

From the output of subsonic filter 180 the filtered signal is split among the inputs of high-pass filter 184 and low pass filter 186, with a relatively small portion of the filtered signal also being conveyed to the signal monitor input 200 of limiter controller 182 via line 248. In this implementation of the invention, both filter 184 and 186 have preset thresholds. High pass filter 184 preferably pass frequencies at or above a predetermined threshold in the range of 120 Hertz to 300 Hertz, with 180 Hertz being typical. Low pass filter 186 preferably pass frequencies at or below a predetermined threshold in the range of 120 Hertz to 300 Hertz, with 180 Hertz being typical.

From the output of high pass filter 184, the high pass filtered signal is connected to the signal input 202 of high pass VCA 188. From the output of low pass filter 186, the low pass filtered signal is connected to the signal input 204 of low pass VCA 190. VCAs 188 and 190 amplify their respective input signals 97 and 101 based on respective control signals 201 and 203 received at their respective control signal inputs 206 and 208 from the respective control signal outputs 210 and 212 of limiter controller 182.

Limiter controller 182 generates the control signals 201 and 203 based on the power level in the signal 75 received at signal monitor input 200 from the output of subsonic filter 180 and on the level of stored energy in the energy storage device 98 received by limiter controller 182 at it monitor input 205 via line 112. Many approaches to generating control signals 201 and 203 would be well known to one skilled in the relevant art, both as to the functional relationship between control signals 201 and 202 and the power level in signal 75 and the energy stored in device 98, as well as how this function is implemented.

Bus Powered Interface Having Software Resident in the Interface to Implement a Frequency Band Type Limiter The frequency band type limiter 100 of FIG. 11 can also be implemented in software or in a combination of software and hardware. These constructions can be done solely in USB speaker 22, or in USB speaker in combination with host computer 12 (shown in FIG. 2). One alternative for the "solely USB speaker 22" implementation is to include an additional programmable controller (not shown) in limiter controller 182. This approach adds extra complexity and expense, and is thus not the preferred approach.

The preferred approach to implementing software or combined software/hardware control of signals 201 and 203 solely in USB speakers 22 is to make use of existing components in USB speaker circuitry 21.

Referring now to FIGS. 11, 12 and 13, in FIG. 12 there is shown a block diagram depicting certain aspects of the architecture of USB Decoder/DAC 96 suitable for implementing in software the control function with outputs of signals 201 and 203. This approach makes use of the controller 224 typically already provided in device 96 for the purpose of controlling the other operations of device 96.

Referring now to FIGS. 2, 7, 11, 12 and 13, preferably controller 224 is an embedded microcontroller that includes a microprocessor 229 connected to RAM 231 and user programmable ROM 230. Preferably ROM 230 is EEPROM, flash memory, or other form of memory that can be reprogrammed in the field to readily accommodate software or other field upgrades. Alternatively ROM 230 is mask-programmable or EPROM. Memories 230 and 231 can be either external or internal to device 96, and may be combined with one or more other components of controller 224 (e.g., in an ASIC). In ROM 230 is stored the software program 228 that implements the desired control function.

The typical functions of USB Decoder/DAC 96 (i.e., decoding signals 87 to produce signals 89) and structures to implement them are well known to those skilled in the relevant art, and so will not be discussed here in detail. USB Decoder/DAC 96 also includes Decoder 227 and Digital to Analog converter (DAC) 232. Decoder 227 is connected to and controlled by controller 224 and is connected to USB data lines 71 and 72. Under control of controller 224, Decoder 227 decodes the signal 87 sent by master hub 42 via lines 71 and 72. Decoder 227 sends decoded digital sound signals 234 to DAC 232 via line 236. DAC 232 is connected to and controlled by controller 224. DAC 232 converts digital signal 234 into analog signal 89 and sends signal 89 to limiter 100 via line 91.

Referring now to FIGS. 11, 12 and 13, FIG. 13 depicts a flowchart of one software implementation 228 of the control function 251 that generates VCA signals 201 and 203. For each VCA signal 201 or 203, in step 240 controller 224 reads the level of power stored in energy storage device 98. This reading can be implemented in a variety of ways. One approach is for limiter controller 182 to include a data/control input/output port 220 that handles the bidirectional flow of data and control signals. Limiter controller 182 would monitor the energy level of energy storage device 98 via line 112 and input 205, and pass this energy level information along in a suitably encoded form 244 to controller 224 via a line 222 connected to a data/control input/output port 242 of USB Decoder/DAC 96. Alternatively, as shown in FIG. 12, line 112 could connect to controller 224 (in addition to or instead of limiter 100) to convey to controller 224 information about the level of energy stored in energy storage device 98.

Next in step 246 controller 224 reads the level of signal 75 from subsonic filter 180. Similar to the reading performed in step 240, this can be accomplished either via a direct connection of line 248 (shown in FIG. 11) to controller 224, or indirectly via the data and control line 222 and its associated signal 244, with signal 244 encoded by limiter controller 182 with information representative of the power level of energy storage device 98.

Next in step 250 controller 224 calculates the VCA signal 201 or 203 to send to either VCA 188 or 190 from control function 251 and then sends the signal in step 252. This can be done using a look up table (not shown), an algorithm (not shown) or other technique well known to those skilled in the relevant art. The control function f(storage power level, signal 75 power level) 251 itself preferably is derived from previously determined characteristics of the sound likely to be played by USB speaker 22, such as musical/game sound effect material. That is, the control function 251 may be based on measurements and analysis done, on a general basis, to produce a knowledge base derived from a survey of the target sounds (e.g., popular music and games).

This empirical approach to conditioning audio is well known to those skilled in the art, and will not be discussed here in detail. Typically in response to a decrease in the stored power level of energy storage device 98, the control function 251 will implement a selective reduction in low frequencies of signal 75, which tend to consume a lot of power, so as to have the least noticeable effect on the ultimate sound 77 (shown in FIG. 6) from a psychoacoustic perspective.

In another aspect of the present invention, subsonic filter 180 (shown in FIG. 11) can either be eliminated, can be switched in and out of the circuit, or could have its threshold frequency varied under control of limiter controller 182 and/or controller 224 of USB Decoder/DAC 96.

In FIG. 11, signal 75 is split into two frequency banks, high pass filter 189 and low pass filter 186. Of course, more than two banks of filter could be used, each with its associated VCA (such as VCAs 188 and 190) controlled by limiter controller 182. Similarly, only one filter 186 or 189 could be used, with the other filter 189 or 186 replaced by a pass through of signal 75 to summing amplifier 192.

Bus Powered Interface with a Host Computer Software Implementation of Limiter Control Function, Including LSB Encoding to Send Control Information from Host Computer to USB Speakers Referring now to FIGS. 2, 6, 7, 11, 12, 13, 14 and 19 an alternative to implementing the control function 251 (i.e., that generates signals 201 and 203) in hardware in limiter controller 182 and/or in software in limiter controller 182 or USB Decoder/DAC controller 224 is to implement control function 251 in the software driver 258 (shown in FIG. 14) used by host computer 12 to drive USB speakers 22. FIG. 14 depicts the driver software 254 resident on host computer 12. Driver software 254 includes USB Speaker Driver 258 as well as drivers for other USB devices (such as USB Mouse Driver 257) and drivers for non-USB devices (such as DVD Driver 256). In this aspect of the present invention, the software program 228 that implements control function 251 is included in USB Driver 258.

Figure 19:
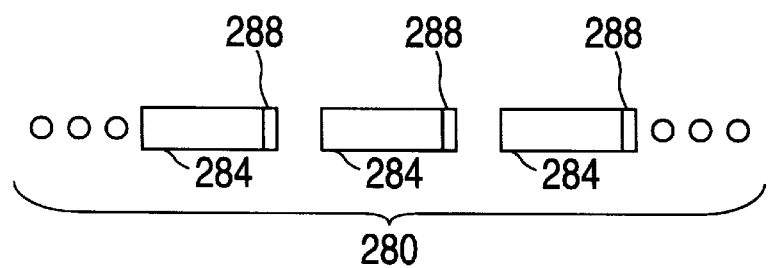
FIG. 19 is a pictorial representation of one of multiple data packets containing digitized audio signals and sent by the host computer to the USB speaker system of FIGS. 1, 2 and 6.

To implement control function 251 of limiter 100 in software in host computer 12, host computer 12 must receive from USB speaker 22 information indicating the power levels of signal 75 and the energy storage device 98. Referring now to FIGS. 2, 11 and 19, this information can be gathered by controller 224 and/or limiter controller 182, and sent to host computer 12 via USB Decoder/DAC 96 and the bidirectional capability of USB data lines 70 and 72 of USB bus 28.

To implement control function 251 of limiter 100 in software in host computer 12, host computer 12 must also send information to USB speaker 22. One approach to sending such information is for host computer 12 to send dedicated control commands (not shown) to USB Decoder/DAC 96 and/or limiter 100 in the digital signal 87 sent to USB Decoder/DAC 96. These commands would be generated by USB Driver 258.

Another approach is for host computer 12 to embed the control commands (not shown) to USB Decoder/DAC 96 and/or limiter 100 in the digitally encoded audio data component (not shown) of the digital signals 87 sent to USB Decoder/DAC 96. Referring now to FIG. 19, a preferred method of embedding the control commands for control function 251 in the audio data is to manipulate the least significant bit (LSB) 288 of one or more audio data words 284 in a packet of data 280 that is part of a series of data packets 280 that encode audio data in one of the audio data formats supported by the USB specification (i.e., types I, II or III). The detailed protocol of each of these types of USB audio would be well known to one skilled in the art, and so is not presented here in detail. Since audio is typically sampled in at a frequency of 44.1 kHz, and each sample is typically encoded as 16 bits (with additional bits for error correction and other overhead of the particular protocol), co-opting LSB 288 of each digitized audio sample would provided a communications channel of approximately 44 kps (kilobits per second), with minimal impact on audio quality since only the LSB 288 would be affected.

To decode the LSBs 288 received from host computer 12 to recover the control function 251, USB speaker circuitry 21 could include a buffer (not shown), preferably located in existing RAM resident in controller 224 and/or 182, that caches digital signal 87 until the LSBs 288 could be recovered and decoded by controller 224 and/or controller 182. The control function 251 represented by LSBs 288 could be the "real time" control function 251 intended to operate on the digitized audio whose LSBs 288 have been co-opted. For this approach, preferably USB Speaker Circuitry 21 extracts the control function 251 represented by LSBs 288 and configures limiter 100 according to the extracted control function 251 before the decoded signal 89 associated with the particular LSBs 288 reaches limiter 100.

Alternately, the LSBs 288 could represent a control function 251 to be implemented at some future time. That is, the control function 251 sent by the LSB encoding could lead or anticipate (by a fixed or a variable time) the signal 89 it is intended to condition. For this leading approach, preferably USB speaker driver 258 in host computer 12 includes a "look-ahead" function to LSB-encode digital signal 87 to allow controllers 224 and/or 182 to implement the associated control function 251 ahead of the signals 89 it conditions.

Another alternative use of LSB-encoding for pre-recorded sound, such as DVD movies (not shown) or audio CDs, is to perform the look-ahead function using a suitable encoder prior to recording the media (i.e., prior to mastering the recording). This approach does not require host computer 12 to perform the look-ahead function, put merely to send the pre-recorded LSB-encoded digital signal 280 to the USB Speakers 22.

Bus Powered Interface Using a Host Computer Software Implementation of Most Limiter Functions Referring now to FIGS. 1, 2, 11, 13, 17, 18, 20 and 21, previous embodiments discussed above implement the signal conditioning functions of limiter 100 entirely in hardware in limiter 100 or in a combination of hardware in limiter 100 with software run either entirely in USB circuitry 21 (e.g., in controller 224 and/or limiter controller 182) or partially in host computer 12 (i.e., as part of USB Speaker Driver 258). Another alternative, described here, is to implement the signal conditioning functions of limiter 100 in software on host computer 12, leaving for USB circuitry 21 the tasks of charging energy storage device 98 in a manner that complies with the current draw limitations of the USB standard and the task of monitoring and reporting to host computer 12 the level of energy stored in energy storage device 98. This approach simplifies the design of USB speaker circuitry 21 at the expense of complicating USB Speaker Driver 258 or other software program (not shown) resident on host computer 12 that implements these functions.

Referring now to FIGS. 14 and 20, there is shown in FIG. 20 a pictorial representation of the software implementation 504 in USB Speaker Driver 258 of the functions of limiter 100. In brief, routine 504 of USB Speaker Driver 258 causes host computer 12 to read each sequential sample of digitized audio 502 from the sound source 500 (e.g., CD player 48 or sound board 52 shown in FIG. 2), judge its signal level 506 (preferably using an algorithm that is part of software routine 504) and replace the digitized audio 502 with new digitized audio 508 that is a function of this signal level 506 and the level 510 of energy stored in capacitor 98 (previously reported to host computer 12 by USB Decoder/DAC 96 of USB Circuitry 21). Host computer 12 sends new digitized audio 508 to USB speaker circuitry 21 as digital signal 28.

Figure 21:
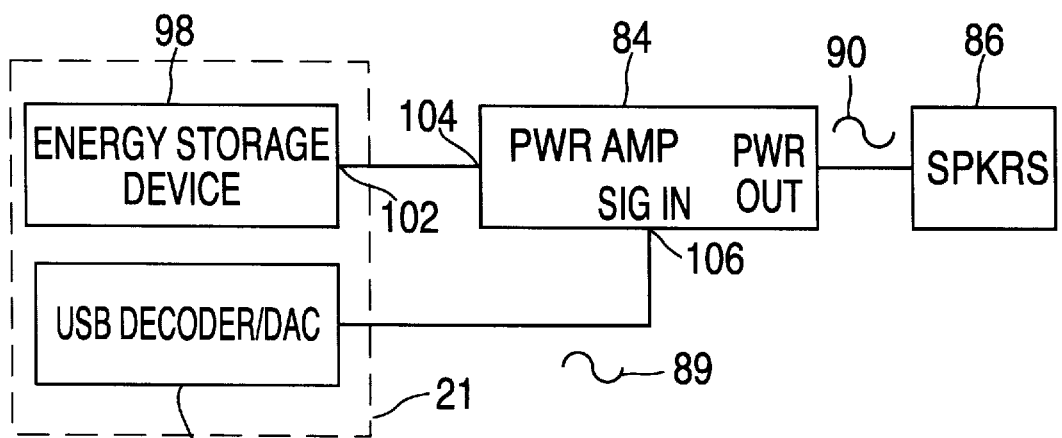
FIG. 21 is a pictorial representation of the modifications to the USB speaker circuitry of FIG. 7 needed to implement the software approach of FIG. 20.

As shown in FIG. 21, in USB speaker circuitry 21 decoded audio signal 89 is now fed directly to the signal input 106 of power amplifier 84, bypassing limiter 100 (shown in FIG. 7) which now only performs the function of reporting to USB Decoder/DAC 96 the level 510 power stored in energy storage device 98. The operation of other components of USB Speaker Circuitry 21 are essentially the same as described in FIGS. 7 through 20 and associated text.

Figure 17:
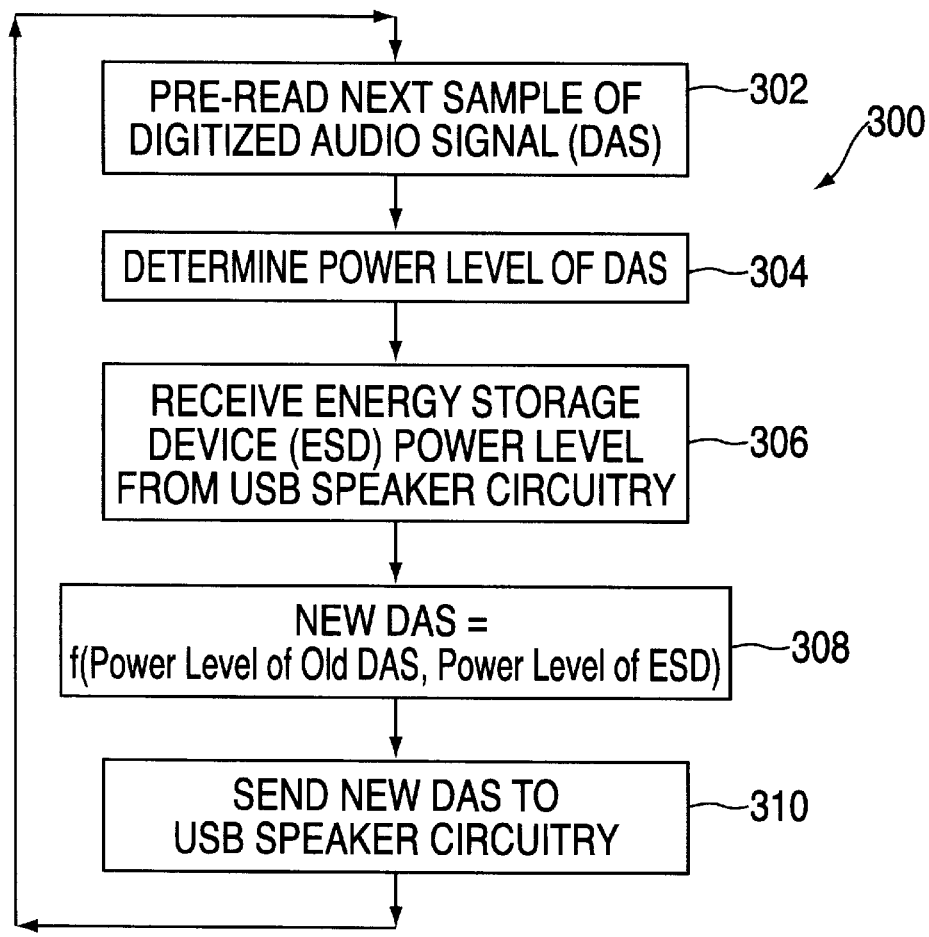
FIG. 17 is a flowchart of a software module that implements in the host computer in software most of the functions of limiter 11 of FIG. 7.
Figure 18:
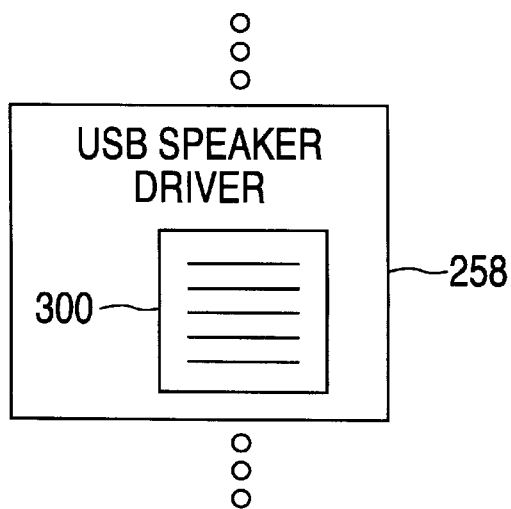
FIG. 18 is a pictorial representation of the software module of FIG. 17 resident in the USB Speaker Driver of FIG. 14.

Referring now to FIGS. 17 and 20, there is shown in FIG. 17 a flowchart 300 of a software program that implements the control functions in software on host computer 12. In step 302 host computer 12 reads the next sample of digitized audio 502. Next in step 304 host computer 12 determines the power level 506 of digitized audio 502. This can be done by computing the root-mean-square voltage of signal 89 (shown in FIG. 7) multiplying this figure by the predetermined gain of power amplifier 84, squaring the result and dividing by the previously known impedance of speaker 86.

Next in step 306 host computer 12 determines the power level 510 in energy storage device 98 from the USB speaker circuitry 21. Under the USB standard, host computer 12 must poll circuitry 21 for power level 510, either after transmitting control data to circuitry 21 to place USB Decoder/DAC 96 in a mode to transmit data or by USB Decoder/DAC 96 presenting report data in an isochronous slot (not shown) which is thereby in a predetermined temporal relationship to transmitted digital signal 28. Note that power level 510 need not be determined for each digitized audio 502: In step 306 host computer 12 can request USB speaker circuitry 21 provide an update to the previously supplied ESD power level 510 every two or more samples of digitized audio 502, every predetermined time period (e.g., every tenth of a second), or in some other fashion. In this manner, no more bus bandwidth is used by USB speakers 22 than required for proper operation, so that sufficiently agile software (not shown) in the host computer 12 can reapportion the access to USB bus 28 by different USB peripherals 22 to optimize overall performance of computer system 10.

Next in step 308 for each sample of digitized audio 502 host computer 12 calculates a new or replacement value of digitized audio 508 as a function of the power level 506 determined in step 304 and the current value of the ESD power level 510 received in step 306. Next in step 310 host computer 12 inserts the new digitized audio 508 in the digital data 87 (shown in FIG. 7 being sent to USB speaker circuitry 21) in place of the digitized audio 502 read in step 302, then loops back to step 302 to process the next sample of digitized audio 502, if any.

Bus Powered Interface Implementing Suspend Mode

Referring now to FIGS. 2, 7, 9, 12, the USB standard includes a mode of operation called the suspend mode. In the suspend mode, a USB device is required to draw less than 500 microamperes of current from the USB port 58 to which it is attached. To be fully compliant with the USB standard, a USB device must be able to enter the suspend mode upon receipt of a suspend mode command in the digital signal 87 from its associated USB master hub 42.

As shown in FIG. 7, preferably USB Decoder/DAC decodes any suspend mode commands from signal 87 and produces suspend mode signal 95 that is carried by control line 91 to various components of USB speaker circuitry 21. At a minimum, line 91 conveys suspend mode signal 95 to suspend mode input 129 of power converter 94 to order power converter 94 to halt (or reduce to a level in compliance with the standard) its drawing of current to charge energy storage device 98.

Preferably control line 99 also conveys suspend mode signal 95 to the suspend mode signal input 65 of power amplifier 84. Amplifier 84 can be controlled by the same signal 95 or a different signal 95 than power converter 94. For example, one signal 95 may place power converter 94 in its suspend mode, while amplifier is either turned off by the same or different signal 95, or placed in a "standby mode" by the same or different signal 95. The standby mode for amplifier 84 is one in which quiescent (i.e., zero-input-signal) current drawn from the power supply (in this case energy storage device 98) is reduced but not to zero. By leaving active devices partially powered in the standby mode certain devices, for example ripple filter capacitors, input coupling capacitors, and output coupling capacitors (if any) remain at their operational D.C. bias voltages and thereby allow resumption of full operation without delays for charging or pops and thumps associated with too-rapid charging.

Figure 24:
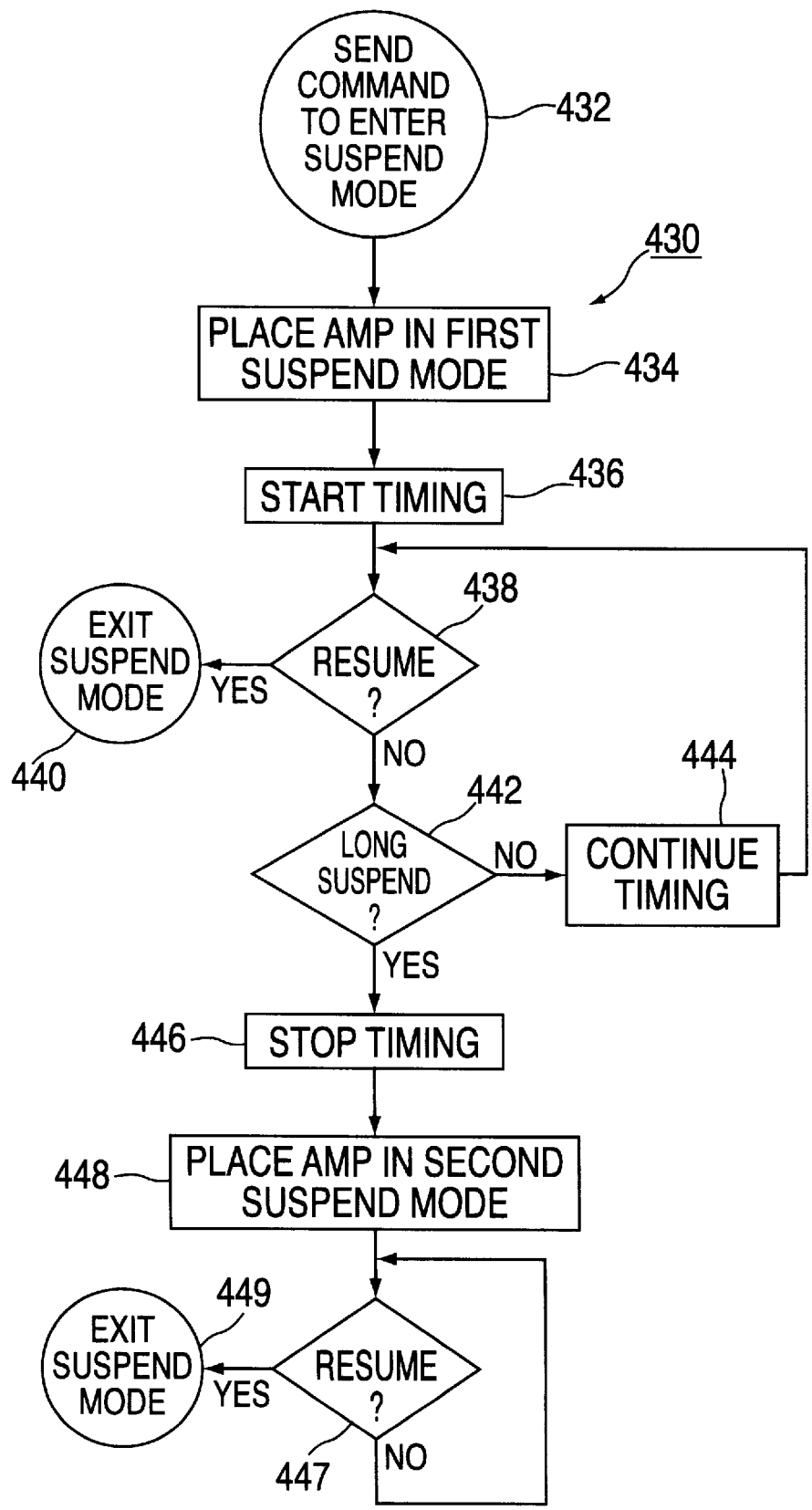
FIG. 24 is a flow chart of a software program embodying the present invention that controls the operation of the USB speakers of FIG. 1 in the suspend mode.

Referring now to FIGS. 7 and 24, in FIG. 24 there is shown a flow chart of a software program 430 that governs the suspend mode behavior of USB Speaker Circuitry 21. Preferably suspend mode program 430 is contained in ROM 230 of controller 224 of USB Decoder/DAC 96. As discussed above, USB Speakers 22 enter the suspend mode in response to a command (not shown) contained in the digital signal 87 received by USB Decoder/DAC 96 from master hub 42. In step 432 of suspend mode program 430, USB Decoder/DAC 96 decodes this command and in step 434 generates suspend mode signal 95. Controller 224 orders signal 95 sent via control line 99 to power converter 94 and preferably to power amplifier 84 as well.

Power converter 94 responds to the suspend mode signal by applying the appropriate voltages to the gates of any MOSFET device(s) 136 (or control electrodes of other switching devices) to turn MOSFET devices 136 "off," i.e., so that the source-drain resistance is very high. In addition, any other portions of power converter 94 circuitry drawing more than permissible currents from USB connections 68 and 66 will be shut off or reduced in current consumption so as to make the overall current drawn from USB connections 68 and 66 by the USB speaker 22 less than 500 microamperes.

Amplifier 84 responds to suspend mode signal 95 by entering a first suspend state. This first suspend state is designed to conserve residual energy in energy storage device 98 by limiting the power drawn from device 98 by amplifier 84 to an amount that (aggregated with the power drawn by other components of USB speaker circuitry 22, such as USB Decoder/DAC 96) complies with the maximum suspend mode current allowed by the USB standard). At the same time, amplifier 84 is one in which quiescent (i.e., zero-input-signal) current drawn from the power supply (in this case energy storage device 98) is reduced but not to zero. By leaving active devices partially powered in the standby mode certain devices, for example ripple filter capacitors, input coupling capacitors, and output coupling capacitors (if any) remain at their operational D.C. bias voltages and thereby allow resumption of full operation without delays for charging or pops and thumps associated with too-rapid charging.

What "ready state" entails depends on the construction of amplifier 84. For class A, AB, and B amplifiers, it means that internal bias currents are at fully operational levels so as to allow undistorted drive in the event of a large signal appearing at the amplifier input. For class D amplifiers it means that the full nominal output switching frequency is present and that the output coupling capacitors (if any) are fully charged. For class G amplifiers it means that internal bias currents are at full operational levels and that multiple rail voltages are at their quiescent values. For all categories of amplifier it means that input and ripple-filter capacitors (if any) are at their operational D.C. bias voltages.

After sending signal 95 in step 434, in step 436 controller 224 starts a timer (not shown) running to keep track of the time USB speakers 22 are in the suspend mode. This timer can be implemented in hardware or software.

Next in step 438 controller 224 determines whether master hub 42 has sent the resume command to end the suspend mode. Alternatively this function is provided by an interrupt command from master hub 42 embedded as a control signal in digital data 87. Upon receipt of the resume command, in step 440 controller 224 sends the appropriate signal 95 to exit the suspend mode. Upon receipt of this signal 95, amplifier 84 exits its first suspend state. This first suspend mode state for amplifier 84 provides substantially an instant "return-from-suspend-mode" capability for speakers 22 for the typically very brief suspend mode periods.

If in step 438 the resume command has not been received, then in step 442 controller 224 determines whether the duration of the present suspend mode exceeds a predetermined threshold. Preferably the predetermined threshold is determined as a tradeoff between the typical interruption intervals of audio based on types of application programs running, the type of power management software employed by host computer 12, the degree of nuisance associated with delays coming out of the second suspend state (e.g., will a portion of a communication be garbled and data lost, or will a sound effect or fragment of music be truncated with minimal perceived loss). Much will depend upon the class of amplifier 84 employed.

If in step 442 the predetermined threshold has not been exceeded, then in step 444 the timer continues timing and program 430 loop back to step 438.

If in step 442 the predetermined threshold has been exceeded, then in step 446 the timer stops timing and in step 448 controller 224 orders the appropriate signal 95 sent to place amplifier 84 in its second suspend state. Next in step 447 controller 224 determines whether USB speaker circuitry 21 has received the resume command (in digital signal 87) from host computer 12. If not, program 430 loops back to step 447, effectively leaving USB speaker circuitry in the suspend mode until the resume command is received. When the resume command is received, in step 449 controller 224 causes USB speaker circuitry 21 to exit the suspend mode and resume normal operations (after whatever necessary tasks, such as delays in returning amplifier 84 to its normal mode from its second suspend mode and charging up capacitor 98).

In its second suspend state, amplifier 84 should be designed to draw even less power than in its first suspend state to minimize the depletion of energy from energy storage device 98. One simple approach to designing amplifier 84 to operate properly in its second suspend state is to simply turn amplifier 84 off.

Other alternatives depend on amplifier class. For class D amplifiers, the system switching frequency can be reduced thus minimizing switching losses due to charging and discharging of MOSFET gate capacitances (not shown). Alternatively the upper and lower MOSFET devices in a typical output stage can both be turned off while other components of amplifier 84, such as voltage comparators, are placed into a "sleep" state. For class G amplifiers internal bias currents can be reduced nearly to zero but with sufficient residual current so as to allow input, filter, and output capacitors (if any) to remain at normal operational D.C. voltages, or to proportionately track the declining power supply voltage from energy storage device 98.

Figure 22:
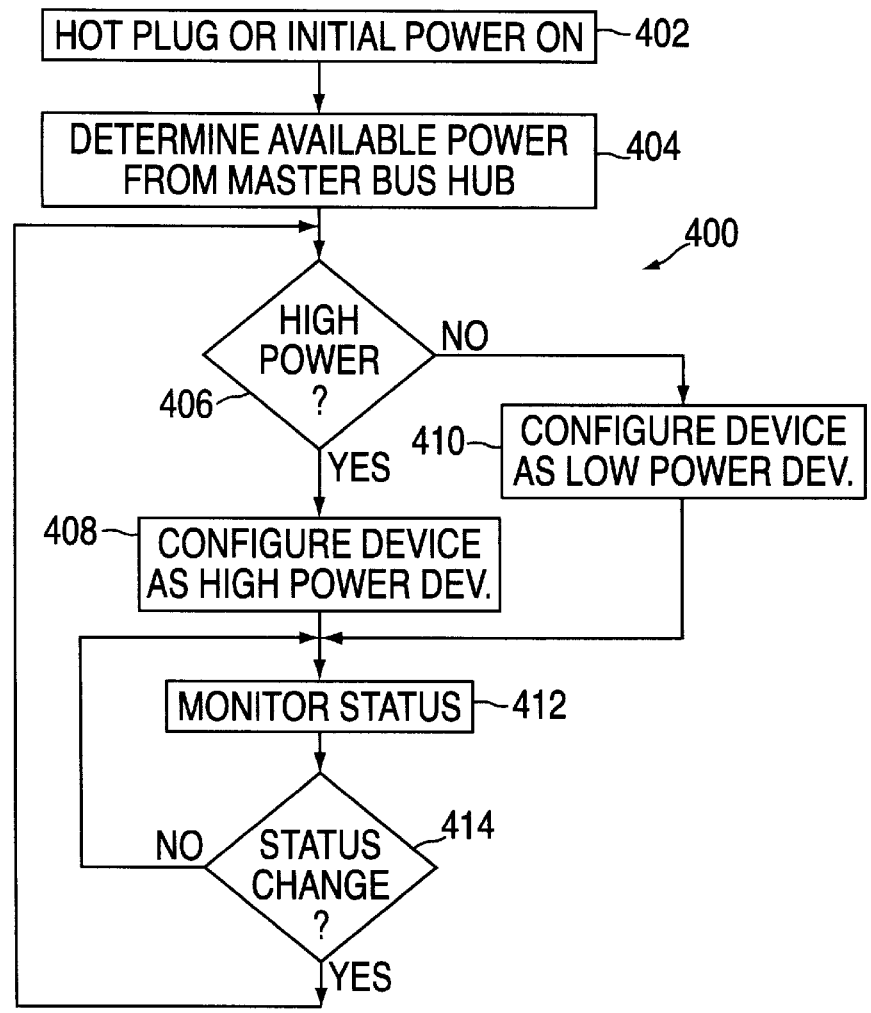
FIG. 22 is a flow chart of a software program embodying the present invention that dynamically adapts the USB speakers of FIG. 1 to operate in either low or high power mode.

Bus Powered Interface that Detects Change in Power Status of Device it is Interfacing to the Bus Referring now to FIGS. 2, 6, 7, 12, 22 and 23, in FIG. 22 there is shown a flow chart of the software 400, preferably resident in controller 224 of USB Decoder/DAC 96, that governs the actions of USB speaker circuitry 21 upon initial start-up of USB speakers 22 and the hot-plugging of USB speakers 22 into USB port 58. First in step 402 controller 224 detects the initial condition of power on or hot-plugging. Next in step 404 controller 224 determines the power available from master hub 42 as part of the handshake routine with master hub 42. In step 406 controller 224 determines whether enough power is available from hub 42 to configure as a high power device. If so, in step 408 controller 224 configures USB speaker 22 as a high power device and proceeds to step 412. If not, in step 410 controller 224 configures USB speaker 22 as a low power device and proceeds to step 412. In step 412 controller 224 monitors control signals from master hub 42 to detect any change in status of the ability of USB speakers 22 to operate as a high power or low power device. In step 414, if master hub 42 signals a status change, then software routine 400 loops back to step 406; otherwise routine loops back to step 412 to continue to monitor for status changes.

Referring now to FIGS. 6 and 7, even in low power mode, USB speaker circuitry 21 can supply potentially useful amounts of power to amplifier 84 to produce useful amounts of sound 92 from speakers 86. In low power mode, USB speaker 22 is limited to drawing 100 mA at a Vcc of about 5 V. Currently commercially available USB Decoder/DACs 96, such as model UDA 1321 from Philips Semiconductors, consume about 165 mW of power (if converted to 3.3 V efficiently, about 33 mA from USB connections 68 and 66). Given highly efficient voltage regulators (not shown) to power USB Decoder/DAC 96, there remains about 67 mA of current to power amplifier 84 to drive speakers 86.

One alternative is for controller 224 to also monitor for the presence of a external power supply, such as a battery or wall transformer (not shown), for USB speakers 22. In FIG. 22 there is shown a software routine 401 that modifies the routine 401 depicted in FIG. 21. In routine 401, after step 402 controller 224 searches in step 416 for the presence of an external power supply (not shown) for USB speakers 22 and preferably also whether this supply is adequate to power speakers 22 (e.g., a battery may be present, but too weak to provide adequate power).

With this information, in step 418 controller 224 determines whether the external power supply is present. If not, routine 401 proceeds to step 404 of routine 400. If so, in step 420 controller 224 communicates to master hub 42 that speakers 22 should be viewed by hub 42 as a low power device. Preferably in this step controller 224 also communicates to hub 42 that USB speakers 22 are being powered by an external device. Then in step 421 controller 224 configures USB speaker circuitry 21 to operate on the external power supply.

Next in step 422 controller monitors the status of the external power supply (e.g., the ability of the external supply to meet the needs of speakers 22, such as the strength of any batteries or the continued connection of a wall transformer). In step 424, controller 224 determines whether the ability of external power supply to meet the needs of speakers 22 has changed. If not, routine 401 loops back to step 422 and continues to monitor the status. If so, routine 401 proceeds to step 404 of routine 400 to determine the power mode in which USB speakers 22 can now operate.

Bus Powered Interface Having an Energy Storage Device that is Dynamically Configurable in Two Different Modes Referring now to FIGS. 1, 6, 7, 26 and 27, FIG. 26 depicts an alternative construction of energy storage device 98 embodying the present invention. This device 98 can be configured in both a low power mode 614 and a high power mode 616 (which should not be confused with the low and high power modes of USB devices). These two modes 614 and 616 can be used to optimize suspend mode operation and facilitate a more rapid possible power-up and commencement of audio sound 77 from USB speaker 22 upon activation of speaker 22 by host computer 12.

In brief, this embodiment of energy storage device 98 employs a capacitor bank 601 having multiple capacitors 600 and 602 that can be switchably connected in parallel under control of controller 224. In low power mode 614, controller 224 connects only a single capacitor 600 from bank 601 across device input 107, allowing that capacitor 600 to charge up more rapidly than if capacitor 602 were connected in parallel with it. In high power mode 616, controller 224 connects capacitor 602 in parallel with capacitor 600 across device input 107, increasing the amount of energy device 98 can store but also increasing the time for device 98 to charge up.

Device 98 includes capacitor 600, capacitor 602, MOSFET 604 and ESD controller 606. Preferably controller 606 is part of controller 224, rather than a separate device. Preferably capacitors 600 and 602 are electrolytic capacitors of about 3300 microfarads and 10,000 microfarads, respectively. Capacitor 600 is connected across energy storage device input 107, ESD output 102 and USB Speaker circuitry output 113, with the positive terminal of capacitor 600 connected to V+Out 143 and its negative terminal connected to Ampcom 141. Also connected across input 107 and outputs 102 and 113 is the series combination of MOSFET 604 and capacitor 602: The negative terminal of capacitor 602 is connected to Ampcom 141, the positive terminal of capacitor 602 is connected to the source of MOSFET 604 and the drain of MOSFET 604 is connected to V+ Out 143. The gate of MOSFET 604 is connected via line 610 to the control output 608 of ESD controller 606. ESD controller 606 is connected to and controlled by (and preferably part of) controller 224 of USB Decoder/DAC 96.

ESD controller 606 produces a signal 612 at output 608 that controls the operation of MOSFET 604, which is configured as a switch. In operation, to place energy storage device 98 in the low power mode 614, controller 606 generates a signal 612 that makes the resistance between the source and drain of MOSFET 604 low. This turns MOSFET 604 "on," thereby connecting capacitor 602 in parallel with capacitor 600. To place device 98 in the high power mode 616, controller 606 generates a signal 612 that makes the resistance between the source and drain of MOSFET 604 high. This turns MOSFET 604 "off," thereby disconnecting capacitor 602 from energy storage device 98.

High power mode 616 is particularly suitable for normal operation of USB circuitry 21. Low power mode 614 is particularly suitable for energy storage device 98 when USB speaker circuitry 21 is in USB suspend mode. After leaving the suspend mode, controller 224 can monitor the voltage level of capacitor 600 and place energy storage device in the high power mode 616 (i.e., connect capacitor 602 in parallel with capacitor 600) when capacitor 600 is at or near its maximum voltage level, at a time of relatively low level of signal 89 (shown in FIG. 7 as the output signal of USB Decoder/DAC 96), or at some other point judged optimal for switching device 98 into high power mode.

Other USB Devices, Other Buses

Figure 28:
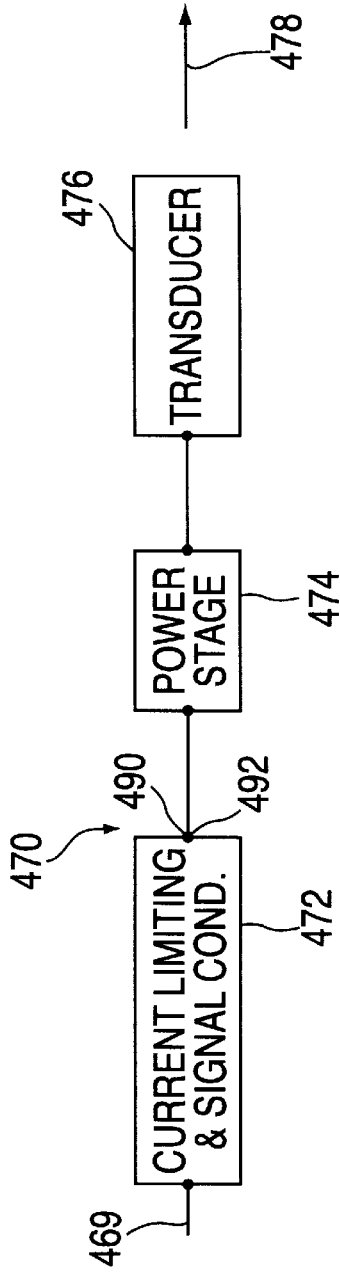
FIG. 28 is a functional block diagram of a device embodying the present invention, similar to the device depicted in the functional block diagram of FIG. 6, but suitable for use with computer and consumer peripherals other than speakers.

Referring now to FIGS. 1, 4, 7, 10, 11, 28, 29 and 30, as depicted in FIG. 6 the operation of the present invention has been described mainly in reference to USB speaker system 22 and its main components (e.g., USB speaker circuitry 21, amplifier 84 and speakers 86). However, as shown in FIG. 28, the embodiments of the present invention that do not solely pre-process signals can be thought of generically as an apparatus 470 that connects to a bus 469 and includes a current limiting and signal conditioning stage 472, a power stage 474 and a transducer stage 476. Bus 469 connects to the current limiting and signal conditioning stage 472 to provide power and signals to this stage 472. In essence, stage 472 includes the structures and performs the functions described above for USB speaker circuitry 21 of FIG. 6: Stage 472 stores energy, and supplies that energy and a conditioned signal to an optional power stage 474 to drive a load or transducer 476. Transducer 478 produces and appropriate signal 478, such as light or sound. In storing energy and providing it to power stage 474, stage 472 limits the current drawn by apparatus 470 to at or below the current limit of the particular standard governing bus 469. Stage 472 conditions the input signal from bus 469 as a function of the level of energy it has stored and the level of the input signal. This function is carefully chosen to minimize the adverse impact of a diminished supply of energy in stage 472 on signal 478, measured by the appropriate standard for the particular output signal 478 (e.g., for a sound signal 478, does it sound good?).

Bus 469 can be any bus that conveys both signals (not shown) and power (not shown) to apparatus 470. Suitable buses 469 are those that 1) place limits on the ability of peripherals (not shown) to draw current from the bus 469; and 2) connect to at least some peripherals expected to have peak power demands that exceed their average power demands (so that these peripherals can benefit from the "smart" energy storage and/or utilization abilities of the present invention. Aside from the USB standard serial bus, other suitable buses include but are not limited to IEEE-1394 (a/k/a "firewire") and even parallel busses such as the Small Computer Systems Interface (SCSI) bus. (Of course parallel busses preferably would condition the signal carried by each wire of the bus, a requirement that is more practical for a serial bus.) Bus 469 need not be limited to a bus connecting computer peripherals (not shown), but can also be used to connect consumer electronic devices to computers and to each other, such as VCRs to television sets (not shown). The based-band signals carried by bus 469 can be analog 496 or digital 494.

Transducer 476 can be any of a variety of suitable devices, including but not limited to a speaker, an RF antenna, a IR LED or a data logging device. Transducer 476 can be another type of load, such as an electric motor, a solenoid, a Surface Acoustical Wave Device, or a battery charger (not shown). Power stage 474 is shown in deference to the fact that most input signals (not shown) from bus 469 need to be amplified or otherwise transformed before being conveyed to transducer 476.

Figure 29:
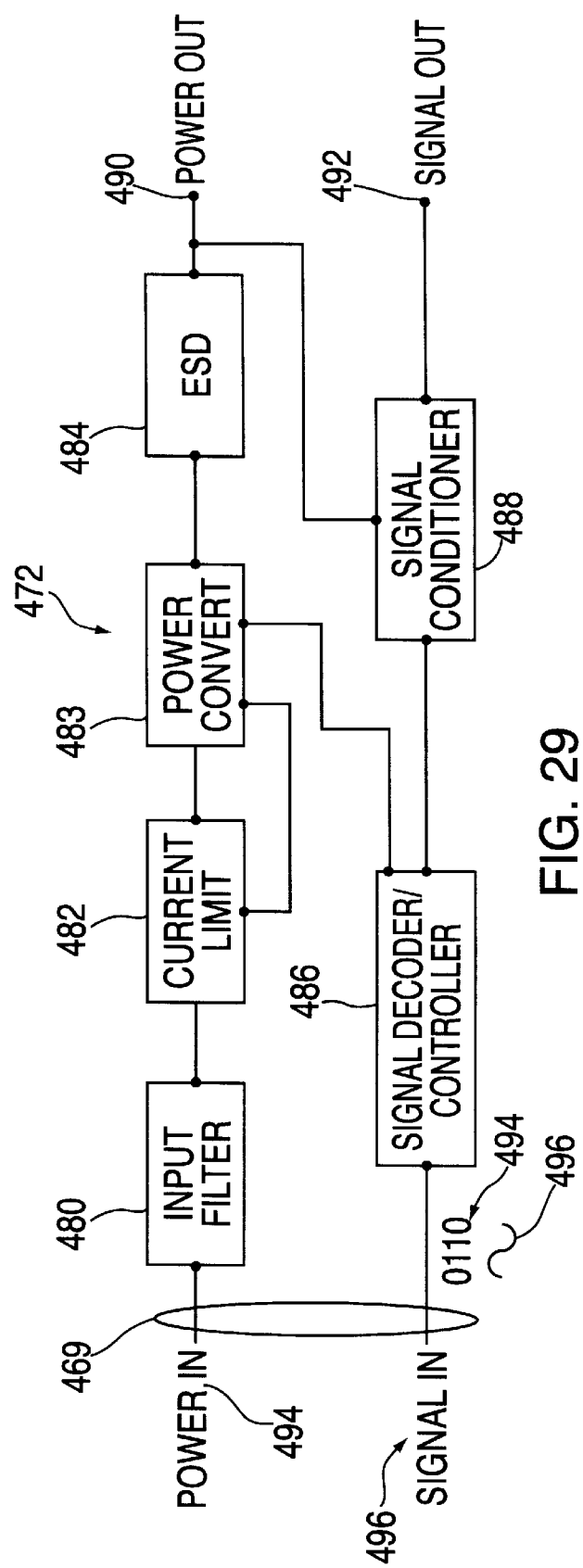
FIG. 29 is a functional block diagram of the current limiting and signal conditioning component of the device of FIG. 28.

Referring now to FIGS. 28 and 29, the structure of current limiting and signal conditioning stage 472 is shown in more detail in FIG. 29. Stage 472 includes input filter 480, current limiter 482, power converter 483, energy storage device 484, signal decoder/controller 486, signal conditioner 488, power input 490, signal output 492, power input 494 and signal input 496. Bus 469 provides power and signals that connect to power input 494 and signal input 496, respectively. Since stage 472 operates essentially as the components of USB speaker circuitry 21 shown in FIG. 7 and described in the accompanying text, the operation of stage 472 will not be described in detail here. With some modifications well known to one skilled in the art the components that are similar in structure and features are the following: input filter 480 with input filter 90; current limiter 482 with current sensor 92 and certain components of power converter 94; power converter 483 and power converter 94; energy storage device 484 and energy storage device 98; and signal decoder and controller 486 and USB decoder/DAC 96.

Referring now to FIGS. 29 and 30, FIG. 30 depicts bus 469 as an IEEE-1394 bus. Two power lines 494 connect to input filter 480, while four wires consisting of two twisted pair sets 497 provide the input signal, with one twisted pair 497 providing a clock signal and the other twisted pair 497 providing the data/control signal. The IEEE-1394 standard limits the current drawn on bus 469 to 1.5 amps. Thus to interface with IEEE-1394, current limiter 482 of current limiting and signal conditioning stage 472 would limit the current drawn by apparatus 470 to 1.5 amps.

The above detailed description is intended to be exemplary and not limiting. To a person skilled in the art, the above discussion will suggest many variations and modifications within the scope of the present invention.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract and drawings), and/or all of the steps or any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. An apparatus for interfacing a bus to a device, the bus including a power line carrying power and a signal line carrying a signal, the device including a power input and a signal input, the interface apparatus including:

a. a power output connected to the device power input;
   b. a power input connected to the bus power line;
   c. a signal input connected to the bus signal line;
   d. a signal output connected to the device signal input;
   e. an energy storage device having an input and an output, the energy storage device output connected to the interface apparatus power output;
   f. a power converter having a power input connected to the interface apparatus power input and a power output connected to the energy storage device input, whereby the power converter receives power from the bus power line and converts it to a form suitable for charging the energy storage device, the power converter further including:

a current sensor being connected in series with the power converter power input and output and having an output carrying a signal representative of the current flowing through the current sensor; and a current limiter having a predetermined current limit, being operably connected to the power converter power input and power output, and having an input connected to the current sensor output for receiving the current sensor signal representative of the current flowing through the current sensor, whereby the current limiter limits the current drawn by the device and the interface apparatus to the predetermined current limit; and g. a signal conditioner having a first input connected to the energy storage device output, a second input connected to the interface apparatus signal input, the signal conditioner including a transfer function that produces a signal conditioner output signal at the signal conditioner output that is a function of the level of energy in the energy storage device and the level of energy of the bus signal or the signal conditioner output signal.

2. The interface apparatus of claim 1, wherein the power converter further includes a buck converter connected to the power converter power input and to the energy storage device input, whereby the buck converter converts power from the bus power line into a form suitable for charging the energy storage device.

3. The interface apparatus of claim 1, wherein the power converter further includes a boost converter connected to the power converter power input and to the energy storage device input, whereby the boost converter converts power from the bus power line into a form suitable for charging the energy storage device.

4. The interface apparatus of claim 1, wherein the power converter further includes a linear current device connected to the power converter power input and to the energy storage device input, whereby the linear current device converts power from the bus power line into a form suitable for charging the energy storage device.

5. The interface apparatus of claim 1, wherein the power converter further includes a flyback converter connected to the power converter power input and to the energy storage device input, whereby the flyback converter converts power from the bus power line into a form suitable for charging the energy storage device.

6. The interface apparatus of claim 1, wherein the energy storage device includes a capacitor connected between the energy storage device input and output.

7. The interface apparatus of claim 1, wherein the energy storage device includes:

a first capacitor;
   a second capacitor;
   a first switch having an open and a closed position; and
   an energy storage device controller; and the energy storage device input further includes a first line and a second line, the first and second lines capable of being at different voltage potentials with respect to each other; wherein:

the first capacitor is connected across the first and second energy storage device lines;

the second capacitor is connected in series with the first switch, and the series combination of the first switch and the second capacitor is connected across the first and second energy storage lines and in parallel with the first capacitor;

whereby when the first switch is closed the first and second capacitors are connected in parallel across the energy storage device input and when the first switch is open only the first capacitor is connected across the energy storage device input.

8. The interface apparatus of claim 1, wherein the energy storage device has a predetermined maximum energy storage level and the signal conditioner further includes:

a voltage controlled amplifier having a signal input connected to the interface apparatus signal input, a signal output connected to the signal conditioner signal output, and a control input, whereby the voltage control amplifier amplifies the interface apparatus signal input to produce the signal conditioner signal output by an amount of amplification controlled by the voltage controlled amplifier control input;

a first low pass filter network having a predetermined filter characteristic, a signal input, and a signal output connected to the voltage controlled amplifier control input; and a clip and detect limiter including:
a voltage scaler having a predetermined scaling factor and having an input and an output, the voltage scaler input being connected to the energy storage device output for receiving a signal representative of the level of energy stored in the energy storage device and the voltage scaler output conveying a signal proportional to the voltage scaler input by the predetermined scaling factor; and a comparator having a first input connected to the voltage scaler output that receives the voltage scaler output signal, a second input connected to the voltage controlled amplifier signal output for receiving the voltage controlled amplifier output signal, an output connected to the input of the first filter network that conveys to the first filter network input a comparator output signal, and a predetermined comparator threshold level against which the signal received from the voltage scaler is compared, whereby when the voltage scaler output signal is above the predetermined comparator threshold the comparator produces a comparator output signal that is substantially equivalent to the voltage controlled amplifier output signal received at the comparator second input, and when the voltage scaler output signal is below the predetermined comparator threshold level the comparator produces a comparator output signal that is the voltage controlled amplifier output signal reduced in magnitude by an amount proportional to the amount by which the voltage scaler output signal is below the predetermined comparator threshold level;

whereby the voltage controlled amplifier control input reduces the amplification of the voltage controlled amplifier when the voltage scaler output signal is below the predetermined comparator threshold level.

9. The interface apparatus of claim 8, wherein the first low pass filter network includes predetermined attack and decay profiles.

10. The interface apparatus of claim 8, wherein the first low pass filter network is a resistor-capacitor network.

11. The interface apparatus of claim 1, wherein the bus signal has a predetermined frequency range and the signal conditioner includes:

a summing amplifier having a plurality of inputs and an output, the output connected to the signal conditioner signal output;

a plurality of frequency band filters, each frequency band filter of predetermined bandwidth and occupying a predetermined portion of the bus signal frequency range, each frequency band filter having an output and an input, each input connected to the signal conditioner signal input;

a frequency band variable amplifier associated with each frequency band filter, each frequency band variable amplifier having a control input to control its degree of amplification, a signal input connected to the output of its associated frequency band filter and having a signal input connected to one of the summing amplifier inputs;

a signal conditioner controller having a signal input connected to the signal conditioner signal input, an energy storage device energy level control input connected to the output of the energy storage device, and a plurality of control outputs, one connected to each of the frequency band variable amplifier control inputs, the signal conditioner controller further including a transfer function for each frequency band variable amplifier that produces control signal to control the degree of amplification that is a function of the level of energy in the energy storage device, the level of energy in the signal received at the signal conditioner signal input, and the particular frequency band filter associated with the particular frequency band variable amplifier.

12. The interface apparatus of claim 11, wherein at least one frequency band variable amplifier is a voltage controlled amplifier.

13. The interface apparatus of claim 11, wherein the signaler includes a low pass filter positioned between the plurality of frequency band filters and the signal conditioner signal input.

14. An apparatus for interfacing a bus powered amplifier to a universal serial bus, the bus power amplifier including a power input that receives power to power the amplifier, a signal input that receives a signal to be amplified, and a signal output that outputs the amplified signal, the universal serial bus including a power line and a signal line, the signal line including a data signal representative of an analog signal to be amplified by the bus powered amplifier, the apparatus including:

a. a universal serial bus decoder having a signal input operably connected to the universal serial bus signal line and having a signal output, whereby the universal serial bus decoder decodes the data signal from the universal serial bus signal line into an equivalent first analog signal and makes the first analog signal available at its signal output;

b. a current sensor connected in series with the universal serial bus power line, whereby the current sensor senses the amount current drawn by the interface apparatus;

c. a current limiter connected in series with the universal serial bus power line and operably connected to the current sensor, whereby the current limiter limits the current drawn by the apparatus from the bus power line in response to the amount of current sensed by the current sensor;

d. an energy storage device having a power input and a power output, its power output being connected to the power input of the bus powered amplifier;

e. a power converter, operably connected to the current sensor, connected to the power input of the energy storage device and to the bus power line, whereby the power converter converts power from the universal serial bus power line into a form suitable for storage by the energy storage device;

f. an energy storage device energy sensor connected to the power output of the energy storage device, whereby the energy storage device energy sensor measures the amount of energy stored in the energy storage device; and g. a signal conditioner, having an input operably connected to the energy storage device energy sensor and an input operably connected to the universal serial bus decoder signal output, and having a transfer function that creates a signal conditioner output signal that is a function of its input signals, whereby the signal conditioner receives the first analog signal and generates signal conditioner output signal that is a function of the energy level stored in the energy storage device and the level of the first analog signal.

15. The amplifier interface apparatus of claim 14, wherein the current limiter limits the current drawn from the universal serial bus power line by the amplifier interface apparatus and the bus powered amplifier to 100 mA or less.

16. The amplifier interface apparatus of claim 14, wherein the current limiter limits the current drawn from the universal serial bus power line by the amplifier interface apparatus and the bus powered amplifier to 500 mA or less.

17. The amplifier interface apparatus of claim 14, wherein the energy storage device is a capacitor.

18. The amplifier interface apparatus of claim 14, wherein the power converter further includes a buck converter connected to the bus power line and to the energy storage device input, whereby the buck converter converts power from the bus power line into a form suitable for charging the energy storage device.

19. The interface apparatus of claim 14, wherein the power converter further includes a boost converter connected to the bus power line and to the energy storage device input, whereby the boost converter converts power from the bus power line into a form suitable for charging the energy storage device.

20. The interface apparatus of claim 14, wherein the power converter further includes a linear current device connected to the bus power line and to the energy storage device input, whereby the linear current device converts power from the bus power line into a form suitable for charging the energy storage device.

21. The interface apparatus of claim 14, wherein the power converter further includes a flyback converter connected to the bus power line and to the energy storage device input, whereby the flyback converter converts power from the bus power line into a form suitable for charging the energy storage device.

22. A method for interfacing a bus to a device, the bus including a power line carrying power and a signal line carrying a bus signal, the device including a power input and a signal input for receiving a device input signal, comprising the steps of a. drawing power from the bus power line and storing the drawn power in an energy storage device;

b. simultaneously with the drawing and storing power step (a), creating a device input signal that the bus signal amplified by a constant, predetermined factor when the level of energy in the energy storage device is greater than a predetermined threshold, and otherwise creating a device input signal that is the bus input signal amplified by a factor determined by reducing the predetermined factor by an amount that is a function of the degree to which the energy storage device is less than the predetermined factor; and c. simultaneously with the drawing and storing power step (a) and the creating a device input signal step (b), limiting to a predetermined current threshold the current drawn from the bus power line by the device power input.

23. An method for interfacing a host computer containing a digitized sound signal that represents a substantially equivalent analog signal via a peripheral bus to a bus powered speaker to play the digitized sound signal, the bus including a power line carrying power and a signal line carrying a bus signal, the bus powered speaker including a power input, a signal input for receiving a speaker input signal, an amplifier for amplifying the speaker input signal and a speaker for converting the amplified speaker input signal to sound, comprising the steps of:

a. reading the digitized sound signal and determining an equivalent analog signal level for the substantially equivalent analog signal of one or more of the digitized sound samples contained in the digitized sound signal;

b. for each equivalent analog signal level determined in reading and determining step (a), creating a digitized representation for the equivalent analog signal level;

c. for each digitized representation for the equivalent analog signal level created in step (b), embedding the digitized representation for the equivalent analog signal level in a digital data stream that includes the digitized sound signal from which the equivalent analog signal level was determined in step (b);

d. sending the digital data stream created in step (c) to the bus powered speaker signal input via the peripheral bus signal line;

e. drawing power from the bus power line and storing the drawn power in an energy storage device in the bus powered speaker;

f. simultaneously with drawing and storing power step (e), limiting the current drawn from the bus power line by the bus powered speaker to a predetermined threshold;

g. during the drawing and storing power step (e) and the current limiting step (f), decoding the digital data stream created in step (d) and received at the speaker signal input to recover the substantially equivalent analog signal and to recover the equivalent analog signal level; and h. during the drawing and storing power step (e) and the current limiting step (f), amplifying the equivalent analog speaker signal by a factor that is a function of the equivalent analog signal level and the level of energy stored in the energy storage device.

* * * * *